March 21, 1961
R. WABNITZ
2,976,392
FLUID DISTRIBUTING APPARATUS
Filed Sept. 4, 1953
6 Sheets-Sheet 1
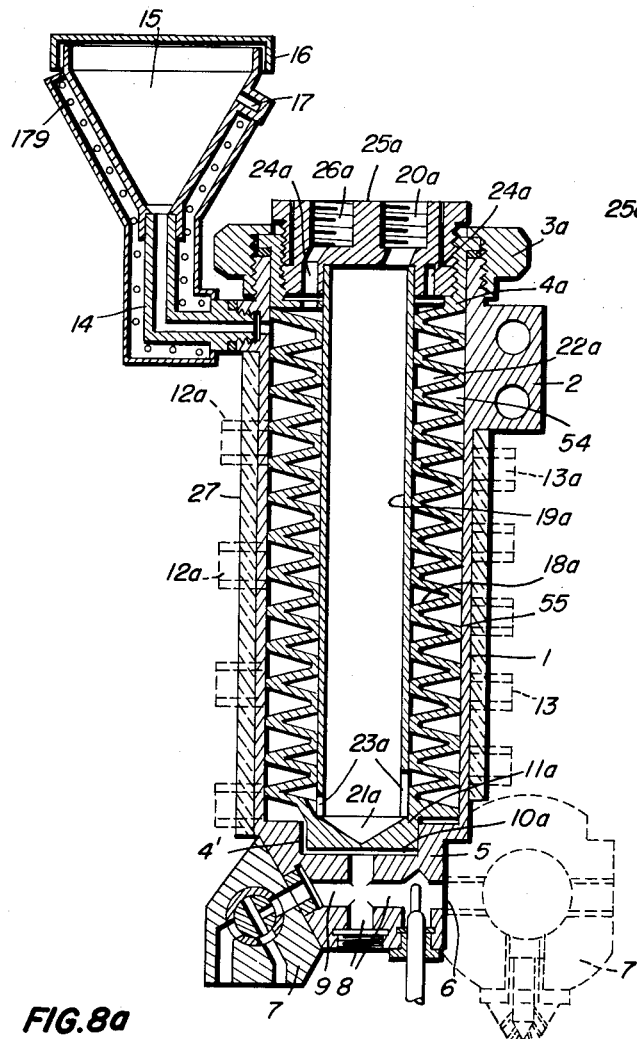
FIG. 1a
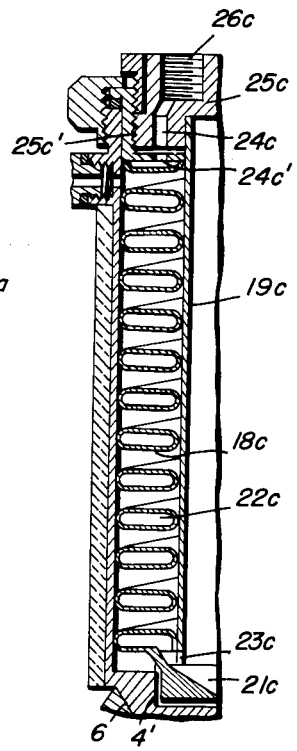
FIG. 1c
FIG. 1b
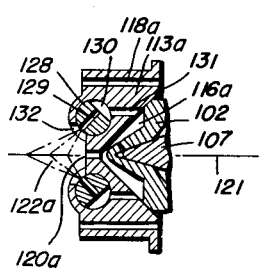
FIG. 8a
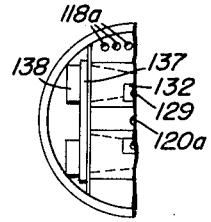
FIG. 9a
INVENTOR
Richard Wabnitz
BY *John B. Summerhart*
ATTORNEY March 21, 1961 R. WABNITZ 2,976,392
FLUID DISTRIBUTING APPARATUS
Filed Sept. 4, 1953 6 Sheets-Sheet 2

INVENTOR
Richard Wabnitz
BY *John B. Summerhart*
ATTORNEY

March 21, 1961  R. WABNITZ  2,976,392
FLUID DISTRIBUTING APPARATUS
Filed Sept. 4, 1953  6 Sheets-Sheet 3
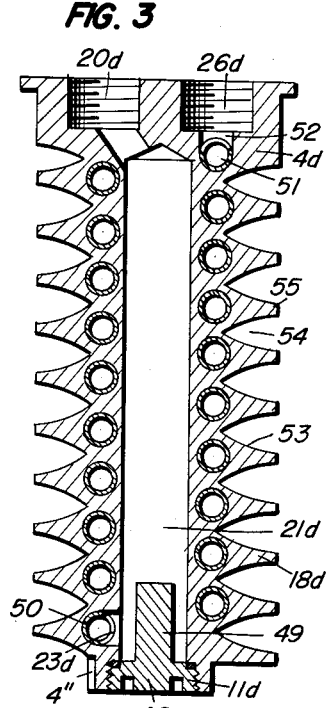
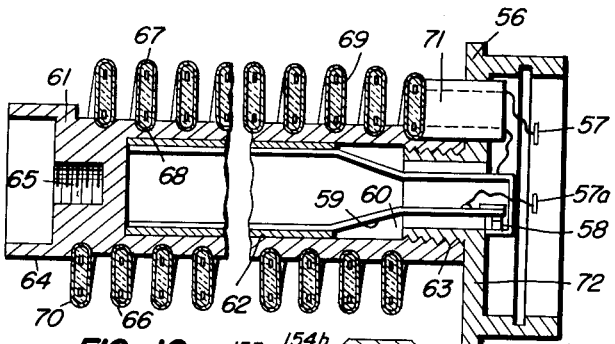
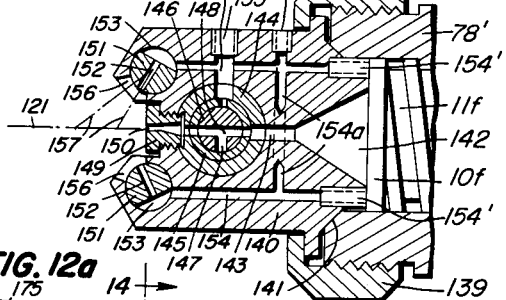
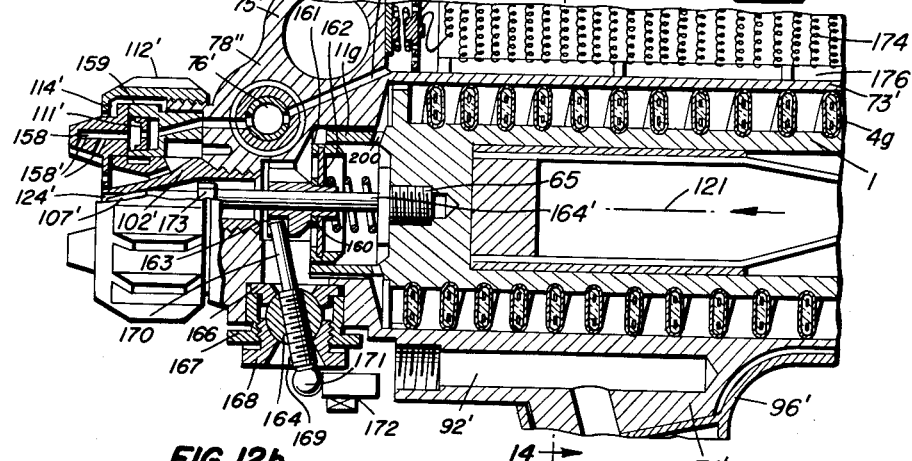
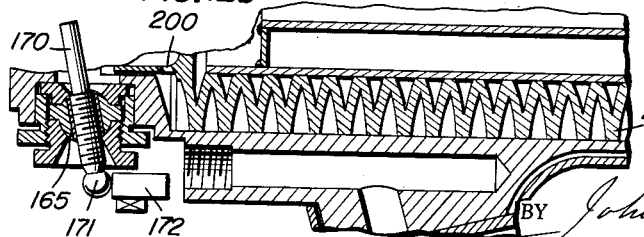
INVENTOR
Richard Wabnitz
BY John B. Armstrong
ATTORNEY March 21, 1961 R. WABNITZ 2,976,392
FLUID DISTRIBUTING APPARATUS
Filed Sept. 4, 1953 6 Sheets-Sheet 4
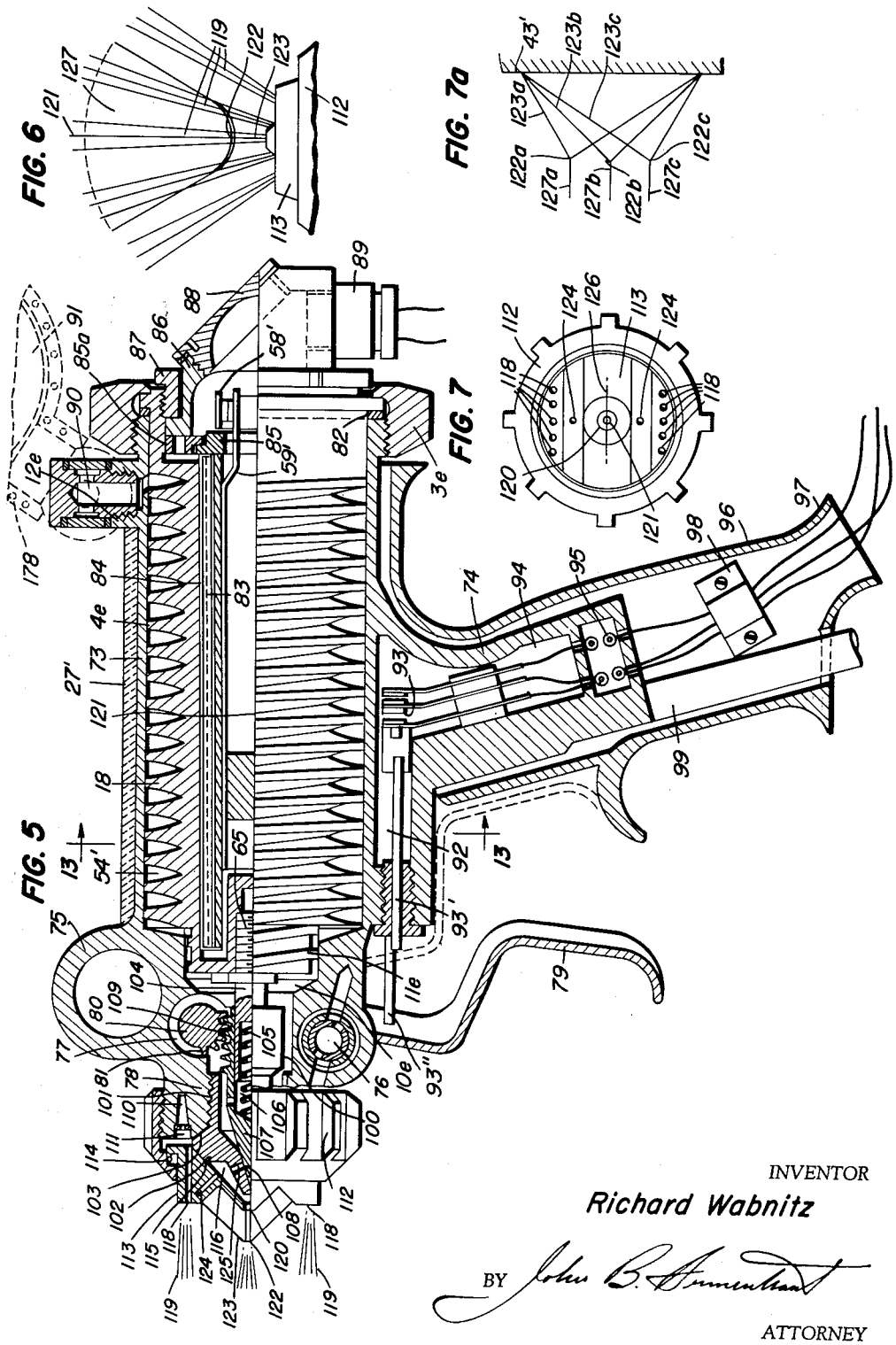
INVENTOR
Richard Wabnitz
BY John B. Blumenthal
ATTORNEY March 21, 1961 R. WABNITZ 2,976,392
FLUID DISTRIBUTING APPARATUS
Filed Sept. 4, 1953 6 Sheets-Sheet 5
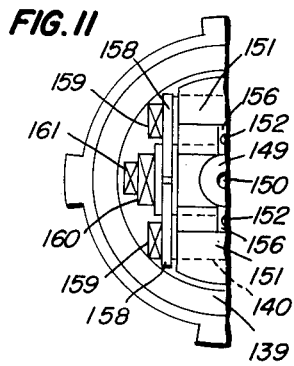
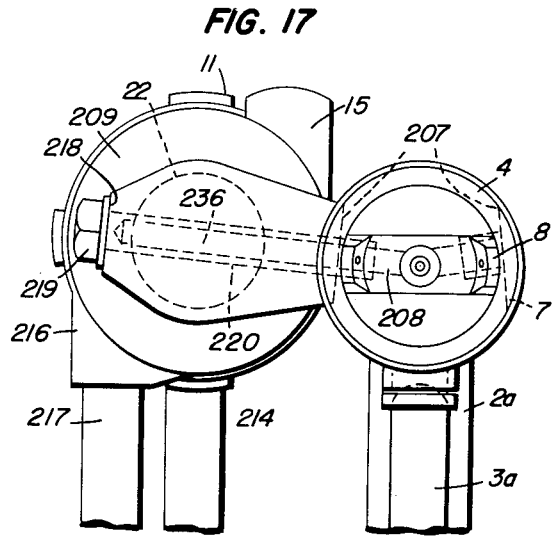
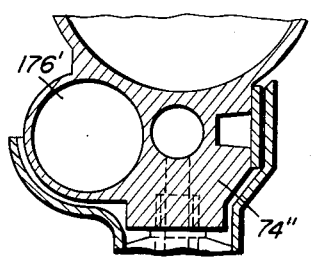
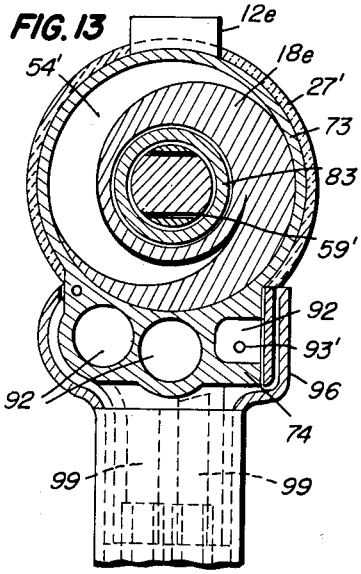
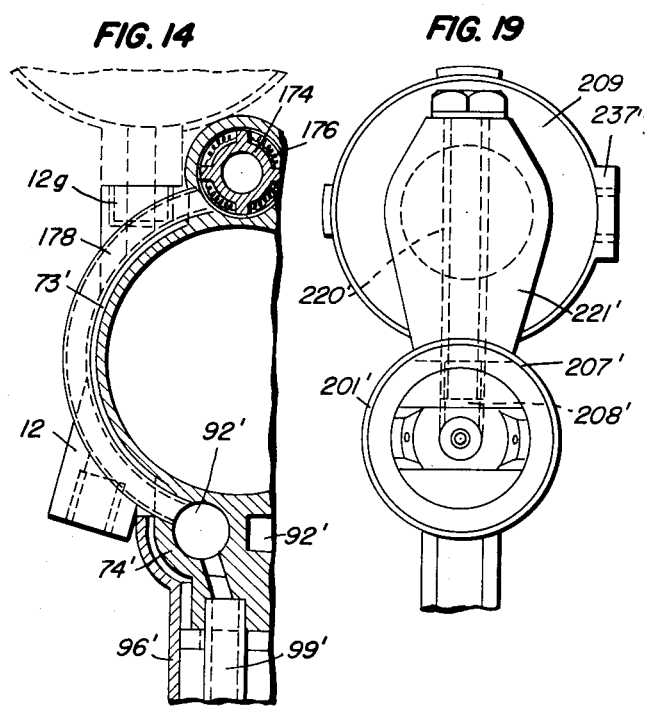
INVENTOR
Richard Wabnitz
BY
ATTORNEY

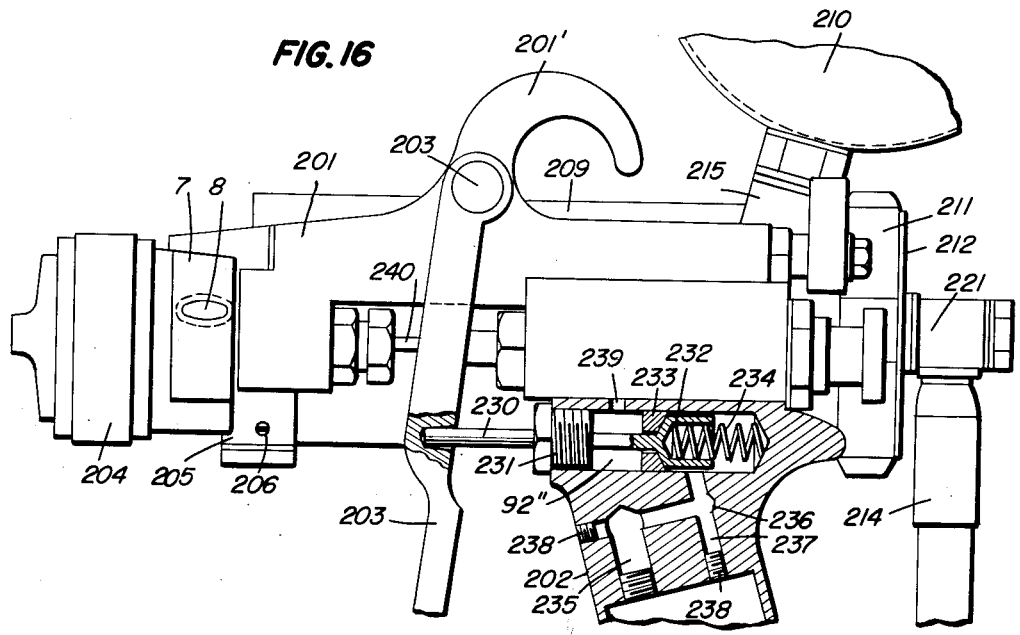
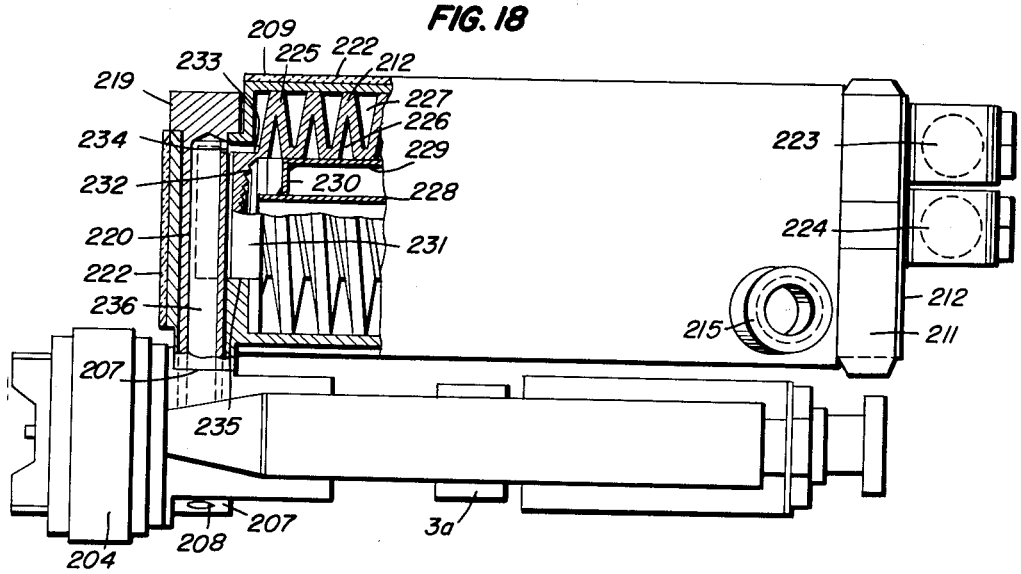

United States Patent Office 2,976,392
Patented Mar. 21, 1961

2,976,392

FLUID DISTRIBUTING APPARATUS

Richard Wabnitz, New York, N.Y.
(27620 Denmar, Warren, Mich.)

Filed Sept. 4, 1953, Ser. No. 378,569

15 Claims. (Cl. 219—39)

The present invention relates to fluid distributing apparatus such as sprayers and the like, for spraying liquid materials such as lacquers and coatings of corrosion resistant materials.

Known processes and apparatus for distributing a fluid usually are provided with tubular heat exchangers which transmit a heat to the fluid to be sprayed as this fluid flows along the interior of the heat exchanger. Such devices are very difficult to clean in a mechanical manner when the material being sprayed does not lend itself to chemical cleaning. Also, with the known structures heat accumulates to an excessive degree at certain parts of the structures which gradually reduces the efficiency with which such parts operate and often forms dangerous working conditions, and moreover the properties of the fluid to be sprayed are very often deleteriously affected by gradual deterioration of parts resulting from heat accumulations.

Furthermore, apparatus used in the laboratory for controlling the temperature of a fluid are constructively different and operate at different specific heat loads than devices which are used as commercially operable fluid distributors, such as spray pitols and the like.

One of the objects of the present invention is to overcome the above drawbacks by providing a fluid distributing apparatus which is capable of distributing a fluid at a particular desired temperature which may be accurately controlled and uniformly maintained.

Another object of the present invention is to provide a fluid distributing apparatus with a heat exchanger capable of being used both in the laboratory and in a commercial device, such as a spray gun, so that laboratory conditions may be duplicated in actual practice.

A further object of the present invention is to provide a fluid distributing apparatus which is capable of being easily cleaned, in a purely mechanical manner, if desired.

An additional object of the present invention is to provide a fluid distributing apparatus with a means for transmitting heat to all parts through which the fluid to be distributed flows independently of heat transferred by the fluid itself so that if the fluid is of the type which solidifies at room temperature, the apparatus may be stopped and started at any time without difficulties because the solidified material will be heated irrespective of where it is located in the apparatus.

Still another object of the present invention is to provide a fluid distributing apparatus with a heat exchanger which may be easily removed from and placed into a housing.

A still further object of the present invention is to provide a spray gun with a means for controlling the manner in which a fluid is sprayed therefrom and which is capable of spraying fluid in streams of different shapes and even in multiple streams if desired.

Yet another object of the present invention is to provide a fluid distributing apparatus which is capable of applying heat to a fluid as the fluid leaves the apparatus or directly after the fluid has left the apparatus.

A still additional object of the present invention is to provide a fluid distributing apparatus which is capable of simultaneously providing two or more streams of different fluids which intersect each other so that the different fluids mix and perhaps react with each other just after they leave the apparatus and just before they are deposited.

It is also an object of the present invention to provide a means for heating and distributing a fluid heating medium in such a way that heat is transferred efficiently from the fluid heating medium to the fluid to be sprayed.

It is also an object of the present invention to provide a process for distributing and combining a plurality of streams of liquid.

It is still another object of the present invention to provide a valve apparatus capable of accurately varying the flow of a fluid in a very simple way.

The objects of the present invention also include the provision of controls for controlling one or more fluids passing through the apparatus of the invention as well as for controlling the heating or cooling means which regulates the temperature of the fluid or fluids to be distributed.

With the above objects in view, the present invention mainly consists of a fluid distributing apparatus, such as a sprayer or the like, this apparatus including a heat conductive housing having an inlet for admitting to the interior of the housing a fluid to be distributed and an outlet spaced from the inlet for discharging the fluid from the housing. A heating or cooling means is located in the housing for heating or cooling the fluid as it passes from the inlet to the outlet, and this heating or cooling means contacts a part of the housing located adjacent to the outlet thereof for transmitting heat to or taking heat from this part of the housing so as to heat or cool the latter in the region of the outlet thereof independently of heat transferred to the housing or received therefrom by the distributed fluid itself.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1a is a schematic, sectional, elevational view of a heat exchanger adapted to be used in the laboratory or for other purpose as desired;

Fig. 1b is a fragmentary view of a heat exchanger similar to that of Fig. 1a but having a differently shaped fluid guide means;

Fig. 1c is a fragmentary view of a heat exchanger identical with that of Fig. 1a except that a third type of fluid guiding element is provided;

Fig. 3 is a sectional elevational view of another form of heat exchanger insert which may be removably located in the apparatus of Fig. 1a;

Fig. 4 is a sectional view of still another type of heat exchanger insert adapted to be used with the apparatus of Fig. 1a, the embodiment of Fig. 4 being provided with an electrical heating means and Fig. 4 showing a control for the electrical heating means;

Fig. 5 is a partly sectional view of a spray gun constructed in accordance with the present invention and having an electrical heat exchanger, Fig. 5 showing also control means for controlling the flow of fluid as well as the temperature thereof;

Fig. 6 is a fragmentary top plan view of the spray head of the spray gun of Fig. 5 and indicates the manner in which fluids flow from this spray head;

Fig. 7 is a front elevational view of the spray head of Fig. 5;

Figures 8B, 9B:
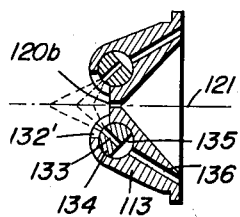

Fig. 7a diagrammatically illustrates a different type of spray head;

Fig. 8a is a sectional elevational view of a spray head having an adjustable nozzle for the fluid being sprayed;

Fig. 8b is a sectional elevational view of a spray head having an adjustable nozzle for a gas which atomizes the fluid to be sprayed or which ejects a combustible gas toward the fluid to be sprayed;

Fig. 9a is a fragmentary front view of the spray head of Fig. 8a;

Fig. 9b is a fragmentary front view of the spray head of Fig. 8b;

Fig. 10 is a sectional elevational side view of another form of spray head having an adjustable nozzle as well as a control which is common to the several fluid streams of the spray head;

Fig. 11 is a fragmentary front view of the spray head of Fig. 10;

Fig. 12a is a partly sectional side elevational view of a spray gun similar to that of Fig. 5 but having a different type of electrical heat exchanger and a different type of controls for the fluid, this embodiment of the invention further having a means for heating an atomizing gas as it flows toward the head of the spray gun;

Fig. 12b is a fragmentary sectional view of a spray gun similar to that of Fig. 12a but having a different type of heat exchanger which is adapted to be heated by a fluid heating medium;

Fig. 13 is a transverse sectional view of the structure of Fig. 5 and is taken along line 13—13 of Fig. 5 in the direction of the arrows;

Fig. 14 is a transverse sectional view of the apparatus of Fig. 12a and is taken along the line 14—14 of Fig. 12a in the direction of the arrows;

Fig. 15 is a sectional fragmentary transverse view similar to Fig. 14 of a slightly different apparatus which has a gas heater located in a different position from the gas heater of Figs. 12a and 14;

Fig. 16 is a fragmentary side elevational view of a spray gun having a heat exchanger mounted at the right side thereof and a fluid supply means mounted on the heat exchanger and Fig. 16 also shows a valve control used with the embodiments of Figs. 5 and 12a;

Fig. 17 is a front view of the apparatus of Fig. 16 without the fluid supply apparatus;

Fig. 18 is a top plan view, partly in section, of the apparatus of Fig. 17; and

Fig. 19 is a front view of a spray apparatus similar to that of Figs. 16–18 but having the heat exchanger mounted on top of the spray gun rather than at the side thereof.

Referring now to the drawings, Fig. 1a shows a pressure resistant heat conductive cylindrical housing 1 having a top open end and being provided with a bracket 2 for mounting the housing on any suitable stationary support or the like. The housing 1 is threaded at its top end to threadedly receive a nut 3a which clamps a heat exchanger insert 4a in the housing 1 in a fluid tight manner so that a fluid in the housing is sealed from the exterior of the housing even at relatively high fluid pressures. The bottom head end 5 of the housing 1 has outer surface portions 6 of various shapes so that different types of devices may be connected to the bottom outlet end of housing 1 in a heat conductive manner permitting heat to be transferred to the different devices 7 which may, for example, take the form of devices for stopping and starting the flow of fluid, devices for regulating the amount of fluid flowing from the housing 1, or discharge nozzles, mixing devices, temperature measuring devices, material applying devices, spray guns, and the like. As is evident from Fig. 1, the head 5 of housing 1 is formed with several bores 8 some of which may be closed and opened to guide the fluid from the bore 9 in a preselected manner.

As is evident from Fig. 1a the head end 5 of housing 1 is formed with an inner cylindrical bore 10a into which the bottom cylindrical end 11a of the heat exchanger insert 4a slidably fits so as to contact the bottom head end 5 of housing 1 at this bore 10a to thereby transmit heat to or from the end 5 of housing 1 for heating or cooling the head 5 of the apparatus. The side wall of housing 1 is provided with openings to which connecting nipples 12a or the like are fastened so that a device for feeding a fluid to be distributed to the apparatus may be connected to any one of the members 12a so that the fluid to be distributed may be received into the housing 1 at any desired part thereof, and also these connections 12a may be used for mounting control devices which extend into the stream of the fluid whose temperature is to be regulated. Also, the housing 1 is provided in its side wall with openings communicating with connecting nipples 1a or the like which are adapted to mount temperature measurement devices on the apparatus or which may carry transparent control devices enabling the distributed fluid to be observed as it flows through the apparatus. Of course, those members 12a and 13a which do not carry any apparatus are plugged. The members 13a can be made transparent from a heat and pressure resistant material, if desired. The entire housing 1 can for special purposes be made entirely transparent with a transparent heat and pressure resistant material so that the temperature controlling process may be fully observed.

A pipe 14 is connected to one of the inlet openings of housing 1 for leading a fluid whose temperature is to be controlled into the housing 1, and this pipe 14 communicates with the bottom end of a container 15 which holds a supply of fluid to be received into the housing 1, this container 15 being closed by a cover 16 and being provided with a connecting tube 17 for leading into the container 15 a pressure medium in gas or liquid form which presses the fluid to be distributed into the housing 1 and through the heat exchanger 4a after one of the devices 7 is opened.

As is evident from Fig. 1a, the heat exchanger 4a is formed by a helically wound wall of V-shaped cross section which engages the inner face of housing 1 to define therewith a helical path 54 for the fluid to be distributed and tested, the helical turns 18a of the heat exchanger being of a large pitch, being hollow and being arranged about and in engagement with the outer surface of a tube 19a.

In the form of the invention shown in Fig. 1b the turns 18b of the helical guide of the heat exchanger are much thicker than the turns 18a and provided with a hollow space 22b of smaller cross section than space 22a in Fig. 1a, and according to the embodiment of Fig. 1c, the helical turns 18c of the fluid guide of the heat exchanger is formed by a coiled pipe of flattened substantially oval cross section. The helical fluid guides 18a and 18b (Figs. 1a and 1b) may be made of a cast metal which is machined, or in the case of Fig. 1c, the helical guide of the heat exchanger is made from a suitable pipe which is passed through compressing rollers or the like to flatten the pipe and to form the same into coils 18c.

For controlling the temperature of certain acids and the like which continuously pass through the apparatus, the entire heat exchanger together with the housing and other auxiliary apparatus are preferably made of a corrosion resistant material.

The outer helical peripheral surface portions of the heat exchangers of Figs. 1a–1c have a sliding fit of very small clearance with the inner face of housing 1 so that, although the heat exchanger inserts may be easily slipped into and out of the housing 1, they nevertheless prevent any fluid communication between the several convolutions of the spiral space formed by the inner surface of housing 1 and the helical turns of the fluid guide. Thus, it is very easy to remove the heat exchangers of Figs. 1a–1c from the housing 1 and to clean the outer surface thereof.

The central pipe 19a is connected to a cap 25 formed with an entrance bore 20a communicating with the interior of tube 19a for guiding a fluid heating medium into the interior of tube 19a, and the bottom end of tube 19a communicates with the inner recess 21a formed in the end 11a of the heat exchanger insert 4a. Also, the tube 19a is formed at its bottom end with cutouts 23a which communicate with the inner helical spaces 22a formed by the helical coil 18a with the outer surface of tube 19a, and in the case of Fig. 1b the cutout 23b in tube 19b communicates with inner helical groove 22b. In Fig. 1c, the cutout 23c communicates with the inner space 22c of the tubular coils 18c, these latter coils being fixed in a fluid tight manner to the outer surface of tube 19c.

Cap 25a (Fig. 1a) is threadedly connected to a top part of the heat exchanger insert, this top part being provided with an outer flange which cooperates with the inner flange of nut 3a so that this nut presses the heat exchanger insert toward the bottom head end 5 of the housing 1 and maintains the insert sealed in the housing 1 against the outer atmosphere. In the case of Fig. 1c, an intermediate member 25c' is located between the cap and housing, this intermediate member being provided with a bore 24a' which communicates with the interior of the tubular coils 18c. These tubular coils have their interior in communication, through the bore of the intermediate member, with a collection space 24c which in turn communicates with an exit bore 26c formed in the cap so that a fluid heating medium entering through the entrance bore (not shown) of the cap of Fig. 1c will move down to the bottom of tube 19c through the opening 23c thereof, upwardly along the coils of 18c, in counter-current to a fluid to be distributed which flows along the exterior of coils 18c along the helical path defined by these coils with the outer surface of tube 19c and the inner surface of housing 1, and finally out through the exit bore 26c. In the case of Fig. 1a the fluid heating medium also flows in counter-current to the fluid to be distributed, this fluid medium moving through the entrance bore 20a of cap 25a downwardly through tube 19a to the bottom thereof, through the opening 23a thereof along the internal helical spaces 22a and to the collection chamber 24a which communicates with the exit bore 26a of cap 25a. Likewise in Fig. 1b fluid passes from tube 19b through openings 23b and helical groove 22b in counter-current to the fluid which is to be heated.

As is apparent from Fig. 1a, the entire housing 1 is covered with a coating of heat insulating material 27 which prevents to a very large extent transfer of heat from the apparatus to the outer surrounding atmosphere. Also, Fig. 1a clearly shows how the container 15 and tube 14 are surrounded with heating coils 179 for maintaining the material in the container 15 and tube 14 at a desired temperature.

Figure 2:
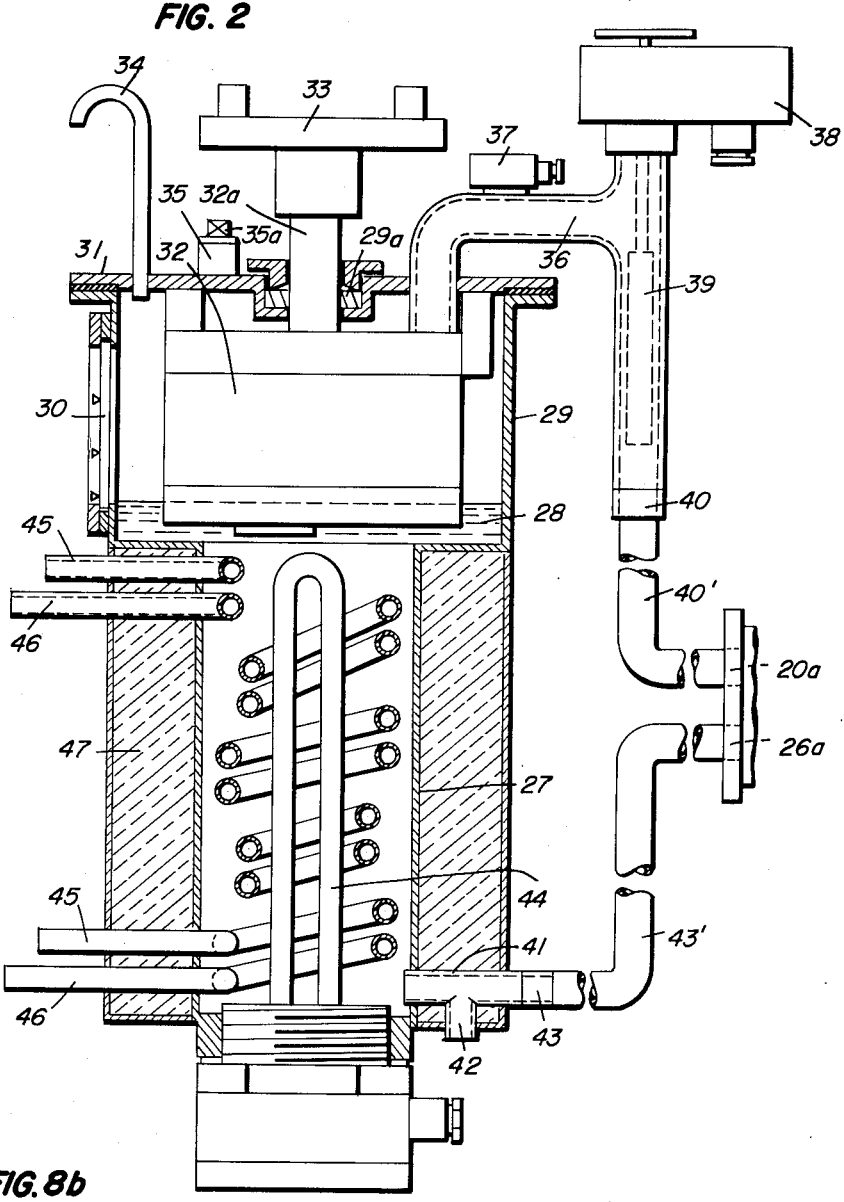
Fig. 2 is a schematic sectional elevational view of an apparatus for controlling the flow and temperature of a fluid heating medium which is used with the apparatus of Figs. 1a–1c.

Fig. 2 of the drawings shows a structure for delivering a fluid heating medium to the apparatus of Fig. 1a and for receiving the fluid medium therefrom, and also Fig. 2 shows a temperature regulating means for controlling the temperature of the fluid medium which flows through the interior of the heat exchange apparatus of Figs. 1a–1c. Referring to Fig. 2, it will be seen that a container 27 is provided for receiving the heat exchanger liquid 28, this container 27 communicating at its top open end with a container 29 in which the liquid 28 may freely expand or contract, this container 29 having conventional tubular glass gauge 30 which indicates the level of liquid 28.

Container 29 is covered with a cover 31 which carries at its under face a pump 32 for circulating the liquid 28, this pump 32 having a shaft 32a extending through a sealing gland 29a and connected to a coupling 33 which is adapted to be connected to a drive for driving the pump 32. Also, the cover 31 is provided with an overflow pipe 34 which also serves the purpose of maintaining the interior of container 29 at atmospheric pressure, and furthermore a tubular inlet 35 having a removable plug 35a is provided in the cover 31 to permit the containers 29 and 27 to be filled through the inlet 35, as required. A tubular outlet 36 extends from the outlet side of pump 32 through the cover 31, and an electrical pressure switch 37 and a temperature measuring and adjustable control device 38 having thermometer 39 are built into the pipe 36 which may be transparent at the part where thermometer 39 is located so that this thermometer may be read. The outlet end 40 of pipe 36 is adapted to be connected to a flexible tube 40' or the like which is also connected to the inlet opening 20a of cap 25a (Fig 1a) so that in this way the pump 32 directs fluid along conduit means 40' extending to the inlet of cap 25 and to the interior of tube 19a.

At the bottom of container 27, an inlet tube 41 is mounted in communication with the interior of container 27, this inlet tube 41 having a threaded end 43 adapted to be connected to flexible tube 43' or the like which is connected to the exit bore 26a of the cap 25a for receiving the fluid from the heat exchanger 4a and directing the fluid back into the interior of container 27.

In the interior of container 27 are located an electrical heating element 44 and a pipe coil 45 together with an additional pipe coil 46, the liquid in container 27 being adapted to have its temperature controlled by the heating element 44 and/or a liquid or gas medium flowing through the coils 45 and/or 46. The circuit in which heating element 44 is located is electrically connected to parts 37 and 38 so that this heating element 44 may be controlled in an automatic manner as will be described below. The container 27 is surrounded by a heat insulating material 47 which, if desired, may surround the container 29.

Fig. 3 shows a heat exchanger 4d which may be inserted into the container 1 in place of any of the above-described heat exchangers, this heat exchanger 4d having an inlet bore 20d and an outlet 26d for respectively leading a fluid temperature controlling medium to and from the heat exchanger of Fig. 3. As is apparent from Fig. 3, the coils 18d of the heat exchanger are cast in one piece with the cap of the heat exchanger and are cast about a cylindrical core to provide the interior of the heat exchanger with a tubular space 21d communicating with the inlet opening 20d.

The cast metal of the heat exchanger of Fig. 3 is poured about a tubular coil 51 so that this coil is embedded in the material of the heat exchanger, and the exit bore 26d communicates with a passage 52 which communicates with the interior of the tubular coil 51, a passage 23d being provided adjacent the bottom of the heat exchanger in communication with tubular space 21d thereof as well as with the bottom-most convolution 50 of pipe 51 so that in this way the temperature controlling fluid medium flows through the pipe 51 in counter-current to the fluid to be distributed which flows along the space formed by the helical coils 18d and inner surface of the housing 1, the inlet and outlet 20d and 26d being respectively connected to end 40 of pipe 36 and end 43 of pipe 41 of the apparatus of the Fig. 2 in the manner described above.

The coil 51 of Fig. 3 is therefore very strongly supported so that a fluid at great pressure may flow through the same, and also the fluid flowing through the coil 51 may have an extremely large temperature range of for example from minus 50° C. to plus 350° C.

In order to permit highly viscous liquids to extend almost entirely into the space between the turns 18d of the heat exchanger, the latter are made of an arcuate cross-section which is concave so that in this way a larger outer surface is provided on the heat exchanger, and this outer surface may be easily cleaned in a mechanical way. Also the outer peripheral surface 55, which is helical and which slidably engages the interior of the housing 1 forms part of a cylinder of the same diameter as inner surface of housing 1 so that a great transfer of heat may take place between the heat exchanger and the wall of housing 1, and the same is true of the embodiments of Figs. 1a–1c where the heat exchangers have a helical peripheral portion of considerable area in direct contact with the inner surface of the housing 1. The tubular space 21d is closed by a plug 48 having an extension 49 extending into the interior space 21d so that considerable heat may be stored in plug 48 to be transferred to the cylindrical end of 11d of the heat exchanger of Fig. 3 which is in slidable engagement with the head 5 of housing 1 at the recess 10a of this head 5, as is shown with the heat exchanger 4a of Fig. 1a, so that in this way a free transfer of heat may take place between the heat exchanger and head 5.

As is evident from Figs. 1a and 3, the heat exchangers are provided with an axial groove 4' and 4", respectively, so that fluid to be distributed may flow through these grooves to the bore 9 of head 5, and Fig. 1a clearly illustrates how the bottom end of the heat exchanger is spaced from the bottom of recess 10a so that a continuous passage is provided from the helical space 54 in housing 1 to the bore 9 of head 5. When the apparatus of Fig. 3 is used in a spray gun such as that shown in Fig. 12a, the plug 48 is made hollow.

Fig. 4 illustrates still another form of heat exchanger, this heat exchanger having a cap 56 in which electrical connections 57a are provided to be connected to a source of current and in which an electrical adjustable contact arrangement 58 for the temperature regulating device 59 is provided, this temperature regulating device 59 being, for example, in the form of bi-metallic strips or coils, thermal elements, or the like, which are located in the tubular space 60 formed in the heat exchanger body 61 and engage the flat surfaces of inserts having curved surfaces engaging body 61 at opening 60 thereof so that the heat of body 61 is transferred through these inserts to the temperature controlling element 59 so that the latter element may maintain the temperature of the heat exchanger at a desired temperature within a predetermined range, or the temperature controlling apparatus may operate to prevent the temperature of the heat exchanger from going above or below a predetermined value.

The end 63 of the elongated heat-conductive body 61 is connected in a fluid and pressure tight manner to the cap 56, and the other end 64 of body 61 is cylindrical in shape so as to be slidably receivable in a recess such as recess 10a (see Fig. 1a) for transfer of heat to a housing in which the exchanger of Fig. 4 is located. When used with an apparatus such that of Fig. 12a, this end 64 of body 61 is made hollow, and is provided with a threaded bore 65 to receive a guide pin according to Figs. 5 and 12a, as will be described below.

An electric heating element 66 is coiled about the substantially cylindrical body 61 and is of an oval cross-section so that the coils 67 of heating element 66 slidably and sealingly engage the inner surface of housing 1 to form with the latter and with the outer surface of body 61 a helical space through which the fluid to be distributed moves in the manner described above, the coil 66 thus transferring heat to the housing 1 and the body 61 being formed with a helical groove 68 in which the coil 66 is located in engagement with the body 61 so that in this way heat is also transferred to the heat exchanger body 61. The oval cross section of heat exchanging element 66 is chosen so that the outer surface of the tubular pipe 69 which houses the electrical heat-producing resistance element of the heating element 66 may serve as a heat transferring surface for directly transferring heat to the fluid to be distributed, the oval shape providing a large helical space for the heat to be distributed as well as a large heat-transferring surface. As a result of the uniform transmission of heat from the element 66 and as a result of the favorable and uniform flow of the fluid to be distributed, a large amount of heat may be transferred with the apparatus of Fig. 4.

The electrical heating element 66 is connected at its one end 70 in a fluid and pressure tight manner to the body 61 and at its other end 71 in a fluid and pressure tight manner to the cap 56, this heating element 66 extending through the wall 72 of the cap 56 and carrying the electrical connecting elements 57 and 57a. That is, an electrical resistance element has both of its ends extending from the end 71 of element 66 and extends through all the coils of this element, and the ends of this electrical element are connected on the one hand to one of the electrical contact elements 57 and on the other hand to the bimetallic strip 59 which is in turn electrically connected to the other contact element 57a so that when these contacts 57 and 57a are connected to a source of current, this current will flow through the bimetallic strip 59 and the resistance element of the heating device 66. As is apparent from Fig. 4, the end of the bimetallic strip 59 which is connected to one of the contacts 57 and 57a is connected through the contacts 58 to the part of the bimetallic strip 59 which is electrically connected to the resistance element extending from the end 71 of the coils of the heating element 66, and these contacts 58 may be adjusted in any known way to open and close the circuit of heating element 66 so as to regulate the temperature of the heat exchanger of Fig. 4 in this way.

The length of the heating element 66 as well as the number of coils and outer diameter thereof are chosen in such a way that the outer pipe 69 of heating element 66 can transfer a desired amount of heat to the fluid to be distributed and at the same time avoid undesirable heat accumulations. The entire heat exchanger insert of Fig. 4 can be used with the structures of Figs. 1a, 5, and 12a and can be exchanged for any of the heat exchanger inserts used with the apparatus of Figs. 1a, 5, and 12a.

A spray gun constructed in accordance with the present invention is shown in Fig. 5 where the pressure resistant heat-conducting housing 73 of the spray gun is shown provided with an extension 74 about which the handle 96 is located, this housing 73 also being provided with an integral eye 75 by which the spray pistol may be hung, and the housing having a gas-control valve 76 and a bore 77 for a regulating apparatus which regulates the flow of the fluid to be distributed, the pistol also having a removable spray-head 78, at its front end, provided with nozzles and liquid applying devices.

The trigger 79 is fastened to a control shaft 80 located in the bore 77 and being turnably supported on the housing 73 for movement about its own axis which extends transversely to the axis of housing 73, this shaft 80 having a gear sector 81 fixed thereto and located within the bore 77. The exchanger insert 4e is inserted from the rear into the large central bore of housing 73 and is sealed from the outer atmosphere by a sealing ring 82 and a nut 3e in a fluid and pressure tight manner. The heat exchanger 4e is heated with an electrical resistance element 83 in the form of a hollow cone and engaging the inner surface of heat exchanger 4e at the conical bore 84 thereof which mates with the outer surface of the conical heating element 83, this heating element being pressed into the heat exchanger device 4e in a yieldable manner through the medium of the inner and outer rings 85 and 85a, the inner ring 85 being located against one end of heating element 83 and the outer ring 85a being removably located in the heat exchanger device 4e at the right end thereof, as viewed in Fig. 5. In the space adjacent to surface 84 of the exchanger device 4e, a temperature controlling element 59', for example a bimetallic strip, is located and provided with adjustable contacts 58', this electric control device being substantially identical with elements 58 and 59 of Fig. 4 and being electrically connected in the same way to an electric resistance wire which is located within the conical heating element 83.

The right end of heat exchanger insert 4e, as viewed in Fig. 5, is closed with a cover 86 which bears against the outer ring 85a, this cover 86 being retained in position by the threaded member 87 which is threadedly connected to the inner surface of heat exchanger 4e, at the right end thereof, as viewed in Fig. 5. This ring 87 presses the cover 86 in a fluid tight manner against the outer ring 85a. The cover 86 is provided with a removable plug 88 which may be removed for the purpose of adjusting contacts 58' to adjust the temperature control and the like, when this plug 88 is removed. The entire heat exchanger unit 4e together with the cover 86, plug 88 and ring 87 are very strongly built so that they will not be in any way damaged by explosions of a combustible gas mixture which may be located in the interior of the apparatus. Thus, these parts provide a protection for the apparatus against explosions. The inner chamber defined by cover 86 communicates with a box 89 through which electrical leads extend to the electrical heating apparatus so as to supply current thereto.

Tubular connection 12e is provided to admit a fluid to be distributed to the interior of housing 73, and a plurality of such elements may be provided, for example, for admitting separate fluids independently into the housing 73 to be mixed therein while being simultaneously heated, the several inlets 12e in this latter case all being located adjacent the rear end of heat exchanger 4e. The tubular inlets 12e are connected to pipes, hoses, or the like, 90 which directly or turnably carry a container 91 for the liquid to be distributed, this container 91 being adapted to have the interior thereof provided with gas under pressure for moving the fluid out of container 91 into the housing 73, in much the same way that a gas under pressure moves through connection 17 into the interior of container 15 in the embodiment of Fig. 1a. Fig. 5 shows a plug and sealing rings closing the pipe extending from connection 12e.

The extension 74 of housing 73 is formed with bores 92 to receive control means for controlling a combustible gas and an atomizing gas under pressure, and one of the bores 92 shown in Fig. 5 houses the electrical switch 93 for controlling the flow of current to the heat exchanger 4e, in accordance with the position of trigger 79 which engages a rod 93' to move the latter to the right or left, as viewed in Fig. 5, so as to open or close the switch 93, this switch having springy arms which automatically open the switch when the trigger 79 is not drawn toward the extension 74 and handle 96 by the operator. It will be seen that the switch 93 is actually made up of two outer contact elements and a central contact element so as to form two pairs of contacts. These pairs of contacts are connected in parallel so that if one set of contacts deteriorates the apparatus will continue to operate properly with the other set. The rod 93' is of course connected to the switch 93 through the medium of a block of electrically non-conductive material. The space 94 in the hollow extension 74 is provided with terminals 95 for electrical leads. The handle 96 located about the extension 74 is made of a heat insulating material and is spaced at all points from the extension 74, so that it is possible, if desired, to insert a heat insulating material between extension 74 and handle 96, and this handle 96 is provided with a bracket 98 and tubular inlet 97 for guiding electrically conductive leads to the terminal members 95. It will be noticed that the handle 96, which is made of a material of very poor heat conductivity, surrounds all parts of the extension 74 and adjacent parts of housing 73 so that the greatest possible protection against contact of the hand of the operator with a part of the apparatus other than handle 96 is provided. The bracket member 98 grips the leads passing to the terminals 95 so as to prevent separation of these leads from the terminals 95 if the cable passing through the tubular inlet 97 of handle 96 should be pulled. A conduit 99 passes through the left part of handle 96, as viewed in Fig. 5, for leading a combustible gas or a gas under pressure to the apparatus, as will be more fully described below.

The bore of housing 73 which receives the heat exchanger device communicates with the smaller substantially cylindrical bore 10e into which the front end 11e of heat exchanger 4e slidably extends so as to contact the housing at the part thereof formed with recess 10e to transfer heat between this part of the housing 73 and the extension 11e of heat exchanger 4e, this part 11e being located at the hottest or coldest part of the heat exchanger 4e. In this way heat is directly transferred from the heat exchanger to the end 78 of the spray gun which carries the spray head. In this manner this end 78 of the apparatus and all of the parts located therein or connected thereto for controlling the amount of fluid discharged from the apparatus, such as for example the nozzle arrangements, are maintained at the same working temperature as the fluid to be distributed completely independently of the heat which is in this fluid to be distributed.

The bore portion 10e of housing 73 communicates with the bore 100 which is threaded at its front end 101 so as to receive the nozzle 102 which is maintained by the threads at end 101 of bore 100 in a fluid and pressure tight engagement with the front surface 103 of the head end 78 of housing 73. The projection 11e of heat exchanger 4e has outer square threads 65 providing a large surface of contact with the head end of housing 73 at the bore 10e thereof, and at its leftmost extremity, as viewed in Fig. 5, the thread 65 is formed with a transverse groove permitting the fluid to be distributed to flow into the bore 10e and from the latter to the bore 100 and nozzle 102.

As is apparent from Fig. 5, the front end of heat exchanger 4e is hollow and threadedly receives the guide pin 104 which is hollow at its front end so as to receive the coil spring 105 which at its end distant from guide member 104 presses against the inner face of bore 106 formed in the needle valve member 107 so as to urge this valve member 107 into its closed position against the inner mating conical face of the nozzle 102 at the discharge end 108 of the nozzle 102, this end 108 also having a conical outer surface. The guide pin 104 is slidably received within the bore 106 of needle valve member 107 so that the latter slides lightly on the guide pin 104 to be guided and centered thereby. The rear end of needle valve member 107 is formed with a rack 109 which meshes with the gear sector 81 of the control shaft 80.

The head end 78 of housing 73 is formed with an annular mixing chamber 110 having a ring 111 extending across the same and formed with bores to prevent a reverse flow of a combustible gas mixture located in this chamber and fed to the chamber through the double-cone valve regulator 76. As is evident in Fig. 5, this valve regulator 76 is connected across a conduit leading at an angle to the plane of the drawing from one of the bores 92 communicating with conduit 99 and leading to the chamber 110. The valve 76 has an outer stationary conical member formed with bores through which the gas may freely flow to chamber 110 and an inner conical member turnable in the outer conical member and having a pair of opposite openings which upon adjustment of valve 76 overlap the openings of outer conical member to a predetermined extent so as to control the flow of the gas in this manner, a handle being located on the side of the apparatus not visible in Fig. 5, and being connected to the inner conical member of valve 76 for turning the latter to a desired extent.

A spray head 113 is pressed against the nozzle 102 by a nut 112 threadedly engaging the head end 78 of housing 73 and overlapping an outwardly extending annular flange of spray head 113, as is shown at the upper left hand part of Fig. 5, and a springy, wavy steel-ring 114 is located between this flange of spray head 113 and the nut 112 and is tightly pressed by these members so that in this way the inner surface 115 of the spray head 113 presses against an annular conical surface of nozzle 102 in a fluid and pressure tight manner to form with the nozzle 102 a pressure chamber 116 for the fluid to be distributed which is separated from chamber 110 for the combustible gas. If desired, an elastic sealing ring may be located at the surface 115 of the spray head 113. This spray head is provided at directly opposite parts thereof with a number of bores 118, each group of bores 118 at one side of the central axis of spray head 113 being located in a fan-shaped arrangement and communicating with the chamber 110 so as to produce a fan-shaped flame 119. At its center the spray head 113 is provided with an outlet nozzle 120 for guiding the material to be distributed along a path coinciding with the axis 121 of housing 73 so as to provide a central stream of fluid along the central axis 121 of the apparatus. The spray head 113 is also formed with a pair of opposite bores 124' communicating with the chamber 116 and having outlet nozzles 124 which direct additional streams of fluid 123 toward the axis 121 to intersect the latter, and the opposite bores 124' and nozzles 124 are symmetrically arranged with respect to the axis 121 so that the two inclined oppositely directed streams of fluid 123 intersect each other and the central stream at a common point. The conical end 108 of nozzle 102 is formed with some bores 125 which are closed by the needle valve member 107 and which serve to guide the fluid medium to the chamber 116 when the valve member 107 is retracted from its closed position.

The housing 73 may be covered with a coating 27' of heat insulating material. As is shown in dotted lines at the top right end of Fig. 5, the tubular end of conduit 90 may be provided with a hollow ball-and-socket joint for permitting a container 91 to be tiltably mounted on the apparatus and this container 91 may be surrounded with heating coils 178. Any of the above described heat exchangers may be used with the apparatus in Fig. 5 in place of the heat exchanger 4e, and since this is true of the heat exchangers of Figs. 1a–1c, it is evident that the same heat exchanger which is used in the laboratory may be used in the commercial spray pistol so that laboratory conditions can be very exactly duplicated in commercial practice with the apparatus of invention.

Fig. 6 shows the spray head 113 in top plan view covered by a part of nut 112, and Fig. 6 indicates the directions in which the flame streams 119 flow from the bores 118 to produce the fan-shaped flame arrangement. Also Fig. 6 indicates how the inclined fluid streams 123 intersect the central stream along axis 121 at point 122 to flatten out this central stream as well as to add to the same so as to form a broad fan-shaped stream 127 of the fluid to be distributed. According to the nature of this fluid to be distributed, such as for example a coating of corrosion-resisting material, it may be possible in some case to omit the central bore of spray head 113 located in the axis 121 so that only a pair of oppositely inclined fluid streams intersect at point 122 and make an angle of less than 90° with each other so that in this way the fan-shaped stream 127 may be made substantially thinner than is the case when the central bore 120 is provided in the spray head 113.

Fig. 7 shows the spray head 113 and the nut 112 as they appear from the front of the apparatus and in the particular example illustrated it is apparent that five bores 118 are provided adjacent the top of spray head 113 while five additional bores 118 are provided at the bottom thereof, each of these groups of five bores being located in a fan-shaped arrangement to provide the streams 119 shown in Fig. 6. Fig. 7 also shows the oppositely inclined nozzles 124 located on opposite sides of the central nozzle 120 of the spray head 113.

Additional nozzles may be arranged beside the nozzles 124 in pairs which are located opposite each other on opposite sides of the central horizontal plane 126 as shown in Fig. 7, and these additional pairs of nozzles may be located along axes which intersect each other at points located above and below the plane 126 so that a plurality of staggered fan-shaped streams 127 may be provided next to and parallel to each other but without contacting each other, so that the individually applied streams of fluid overlap each other. Such an arrangement is diagrammatically illustrated in Fig. 7a where the pairs of streams 123a, 123b and 123c intersect each other to form individual fan-shaped streams 127a, 127b and 127c, respectively, which are located one above the other and which overlap each other, the streams 123a issuing from a pair of nozzles located on one side of nozzles 124 (Fig. 7) and being inclined differently therefrom and from each other so that the streams 123a intersect at point 122a above the plane 126, while the streams 123c issue from a pair of nozzles located on the opposite side of nozzles 124 and are of such an inclination that the streams 123c intersect at point 122c located below the plane 126, and the streams 123b issue from nozzles identical with nozzles 124 so that the stream 127b is located in the plane 126 (Fig. 7). It will be noted that with an arrangement as shown diagrammatically in Fig. 7a the individual pair of streams will not intersect each other or the fan-shaped streams produced thereby.

Fig. 8a shows an arrangement in which the nozzles of spray head 113a are adjustable, the spray head 113a of Fig. 8a being interchangeable with spray head 113 of Fig. 5. The spray head 113a of Fig. 8a operates in much the same manner as spray head 113 of Fig. 5 and is provided with identical bores 118a for a combustible gas. Also, the identical nozzle 102 of Fig. 5 is arranged within the spray head 113a in the same way as is the case with the spray head 113. The embodiment of Fig. 8a differs from that of Fig. 5 in that the nozzles 124 are replaced by adjustable nozzles 128 which are turnable in the spray head 113a about axes transverse to the central axis 121, respectively, these nozzles 128 being formed with nozzle-shaped outlets 129 which communicate with cutouts 130 formed in the members 128 and communicating with the bores 131 which in turn communicate with the pressure chamber 116a for leading the fluid medium to be distributed to the outlet bores 129.

The two adjustable nozzles 128 are parallel to each other and are each provided at one side with an extension 138 for turning these nozzles about their central axes, and also each elongated conical nozzle member 128 is provided next to the extension 138 with a gear sector 137. These gear sectors mesh with each other so that upon turning of one nozzle member 128 the other nozzle member 128 will necessarily be turned to the same extent but in an opposite direction, so that in this way the streams from the oppositely located bores 129 will always intersect at a point located along the central axis 121, and it is evident that this arrangement permits the intersection point of the streams to be moved forwardly or rearwardly along the centrally located axis 121 so that the fan-shaped stream may be regulated in a desired manner. The sharper the angle included between the two oppositely directed intersecting streams, the smaller and longer the fan-shaped stream of fluid so that at the same time the cross-section of the stream along the axis 121 becomes thicker and in this way the thickness of the applied coating increases. The further the intersection point of the streams is moved toward the spray head, the broader becomes the fan-shaped stream along the axis 121 and thus the thickness thereof decreases to decrease the thickness of the applied coating of fluid material, such as, for example, a coating of corrosion-resistant material. The outlet nozzles 129 communicate respectively with arcuate cutouts 132 formed in the front wall of the spray head 113a.

Fig. 8b shows another type of spray head wherein the combustible gas nozzles 118 are omitted and instead a pair of nozzle members 134 are arranged similarly to nozzle members 128 on opposite sides of the central nozzle outlet 120 which is located at the axis 121, these nozzle members 134 being turnable about their axes in the same way as nozzles 128 and being provided with meshing gear sectors 137' and with non-circular operating extensions 138' so that in this way the nozzle members 134 are also constrained to rotate simultaneously in equal and opposite directions whenever one of these nozzle members is turned. Each of the nozzle members 134 is provided with a nozzle-shaped outlet bore 133 respectively communicating with the arcuate cutouts 132' formed in the front wall of the spray head 113b of Figs. 8b and 9b. Each of the nozzle members 134 is formed at the inner end of the nozzle shaped bore 133 with a transverse groove 135 which communicates with a bore 136 formed in the spray head 113b and which leads to the chamber 117, shown in Fig. 5, for the combustible gas mixture. In this way oppositely directed flames of the burning mixture will intersect at a desired point along the axis 121 to directly contact the stream of fluid issuing from the central nozzle 120 so that in accordance with the pressure of the burning gas and the angle of nozzles 134 these flame streams will make a fan-shaped stream of fluid of a desired breadth, and if the pressure of the gas is increased sufficiently, this gas may be used to atomize the stream of fluid issuing from the nozzle 120. Instead of a combustible gas, a non-combustible gas may be used which operates on the stream of fluid issuing from the nozzle 120b in practically the same manner as was described above. It is also possible to provide in nozzle members 134 a plurality of nozzle-shaped bores 133 located beside each other and arranged in pairs opposite each other in the manner indicated in Fig. 7a, and the arrangement of Fig. 7a may also be provided in the adjustable nozzles of Fig. 8a.

Fig. 9a shows the structure of Fig. 8a in front view, and the plurality of bores 118a are visible in Fig. 9a as well as the conical shape of the nozzle members 128. Also Fig. 9a shows the gear sectors 138 and non-circular extensions 138. Fig. 9b shows the arrangement of Fig. 8b in front view, and it is also evident that nozzle members 134 are conical, and Fig. 9b also indicates how the nozzle members are provided with non-circular members 138' and intersecting gear sectors 137'.

Fig. 10 shows another type of spray head 140 which is adapted to be removably mounted on a head end 78' of a spray pistol which is identical with that of Fig. 5 except for the structure of the head end 78' and the spray head mounted thereon. The front end 11f of the heat exchanger has its outer square threads in slidable engagement with the inner surface with the head end 78' of the spray gun. In this manner the material to be distributed flows through the threads of member 11f to the chamber 10f formed by the head end 78' of the spray gun. It will be noted that no apparatus for regulating the amount of fluid, similar to elements 80, 81, 109, and 107, is provided with the arrangement of Fig. 10, so that this latter embodiment is simpler than that of Fig. 5, and furthermore, no gas regulating valve 76 or the like is included in the embodiment of Fig. 10.

The nut 139 threadedly engages the outer surface of head end 78' of the apparatus and has an inner flange located in overlapping relation with an annular flange of the spray head 140 so that this spray head 140 is in this way removably clamped onto the head end 78', and a conical annular surface 141 of spray head 140 is tightly pressed against mating conical annular surface of head 78' so that in this way the spray head 140 is mounted on the apparatus in a fluid and pressure tight manner. The heat from the member 11f is transferred through the head 78' directly to the spray head 140 by the contact with the surface portion 141 thereof, and also heat is transferred through the nut 139 to the spray head so that the latter is heated independently from the fluid which is sprayed. This fluid is collected in the inner chamber 142 of spray head 140, which forms an extension of the chamber 10f, and flows from the chamber 142 along the axial bore 143 to the valve apparatus which controls the amount of fluid discharged from the apparatus, this valve apparatus including an outer sleeve 144 inserted into the spray head and having a conical bore to receive the outer main regulating cone-shaped valve member 145 in which a further conical valve member 146 is turnably arranged.

The outer conical member 145 is formed with a pair of opposite bores located along the central axis 121 and with a third bore located intermediate these two bores and communicating with a passage 155 formed in the spray head, being shut at its outer end by a plug 155', and passing through the sleeve 144. The inner conical member 146 is formed with a pair of intersecting bores 147 and 148 which form a T-shaped passage in the valve member 146, and both valve members have extensions located at the exterior of the apparatus so that their positions may be regulated. The bore 143 also passes through the sleeve 144 so that this latter bore may be closed or opened to a desired extent by turning the outer valve member 145. At the front end of the spray head 140, along the central axis 121, a removable and exchangeable nozzle 149 formed with bore 150 is provided to discharge the fluid to be sprayed from the aparatus along the central axis 121. On opposite sides of the nozzle 149 are located a pair of parallel conical nozzle members 151 each of which is formed with a nozzle outlet 152 and with an inner transverse groove 153 which communicates with the bores 154 formed in the spray head 140, these bores 154 being closed at their right ends by plugs 154' and communicating only with each other by a transverse bore 154a plugged at its top end by plug 154b. The bores 154 of Fig. 10 thus communicate with the passage 155. Bore 154a does not communicate with passage 143. The spray head is is formed at its front wall with cutouts 156 communicating with nozzle-shaped bores 152 so that the fluid issuing from the bores 152 passes through the cutouts 156. The inner conical member 146 turns together with the outer conical member 145 when the latter is turned.

As is shown in Fig. 11, the nozzle members 151 are of conical shape, and the cutouts 156 are clearly illustrated in communication with the bores 152. Also, the central location of nozzle 149 and its outlet bore 150 is illustrated. Each of the conical nozzle members 151 is fixed to a gear sector 158, and these gear sectors mesh with each other so that the nozzle members 151 turn in equal and opposite directions simultaneously upon the turning of one of the nozzle members 151 through engagement of a suitable handle, tool, or the like with one of the non-circular projections 159 respectively located at the ends of nozzle members 151. In this way the intersection of the oppositely inclined streams of fluid issuing from the bores 152 will always be located along the central axis 121. Non-circular ends 159 of the nozzle 151 may be square-shaped. The outer main conical valve 145 carries at the exterior of the apparatus a square operating end 160 as shown in Fig. 11, and the operating end 160 is hollow to permit the operating end 161, which is also square-shaped, of the inner valve member 146 to extend through and beyond the operating end 160 of valve member 145. A trigger such as the trigger 79 of Fig. 5 is fixed to the operating end 160 of main valve 145, while a small adjusting disc or knob may be fixed to the square operating end 161 of the auxiliary valve member 146.

If it is desired to prevent the flow of the fluid from any of the adjustable nozzles of Figs. 8a–11, it is only necessary to turn these nozzles through a distance sufficient to move the outlet bores thereof beyond the cutouts in the front walls of the spray heads such as the cutouts 132, 132' and 156, so that in this way the outlets of the nozzles are closed.

Referring now to Fig. 12a, it will be seen that this embodiment of the invention is provided with an elongated substantially cylindrical and heat conducting housing 73' provided with an extension 74' covered by the handle 96', the housing 73' also being provided with an eye 75' by which the apparatus may be hung from any suitable support and being provided with a bore 92' for a control which regulates air under pressure. A heat exchanger 4g identical with that of Fig. 4 is inserted into the housing 73', and Fig. 12b shows an embodiment identical with that of Fig. 12a except that it is provided with a heat exchanger 4h similar to that of Fig. 1a. The housing 73' is formed with a bore portion into which the cylindrical end 11g of heat exchanger 4g slidably extends so as to contact the front head end 78" of housing 73' for transmitting heat to the latter, and in the embodiments of Fig. 12a and Fig. 12b the front end 11g of the heat exchanger 4g is hollow and formed with one or more openings 200 to admit fluid from the helical space defined by the heat exchanger unit with the inner surface of housing 73' into the hollow portion of extension 11g of the heat exchanger unit. A valve 76', similar to valve 76 of Fig. 5, is mounted in the head end 78" to control the flow of an atomizing gas under pressure, this valve 76' being in the form of a double cone and being capable of finely regulating the flow of gas by the turning of the inner conical member of this valve which is provided at the exterior of the apparatus with an independent operating end portion.

A nut 112' presses a springy, wavy wire ring 114' against the spray head 158 of Fig. 12a which is in turn pressed against an intermediate ring 159 formed with suitable bores and an annular passage, similar to the chamber 110 of Fig. 5 and being provided with an apertured ring 111', for distributing the atomizing air under pressure to the spray head 158. As is shown in Fig. 12a, the ring 111' with small apertures is located in the annular passage of ring 159 for preventing a reverse in the flow of the gas.

A nozzle 102' is mounted in the head end 78" of housing 73' to direct the material to be sprayed from the apparatus, this nozzle 102' being provided with a central outlet bore 124' and cooperating with a conical needle valve member 107' to regulate the amount of material discharging from the apparatus. The needle valve member 107' is removably mounted in a tubular member 160 which is slidably mounted on a guide pin 104' which is in turn threadedly connected in the bore 65 of the heat exchanger unit 4g. A porous filter plate 162 is located on the tubular member 160 and moves therewith as will be pointed out below. The member 160 is formed with a cutout 163 into which the top free end of a tiltable lever 170 extends, this lever 170 being removably mounted on a ball-shaped bearing member 164 or in an elastic member 165, as shown in Fig. 12b. This elastic bearing member 165 may be made of any synthetic material, buna rubber, or the like. Either of the members 164 and 165 is turnably located in a spherical mating recess of a member 166 which is fixed in the head 78" by a sleeve 167 threadedly engaging the head 78" and from the outside the members 164 and 165 are turnably retained by a nut 168 threaded into the sleeve 167 and also being formed with a spherical recess mating with the member 164 or 165. The members 166 and 168 are formed with conical cutouts through which the lever 170 freely extends so that the latter may be turned in a plane which includes the central axis 121 of the apparatus. The lever 170 is provided with an outer spherically shaped free end 171 against which a rod 172 of a linkage is located, this rod 172 being, for example, actuated by an eccentric, a lever, a push-rod or the like which is actuated by a trigger similar to the trigger 79 of Fig. 5. In other words, a push rod 93" of Fig. 5 may be actuated by the trigger and may be linked to the member 172 which is turnably mounted on the apparatus so as to turn this member 172 and thereby turn the lever 170 to move the member 160 automatically in accordance to the extent the trigger is pulled by the operator. Rod 93" of Fig. 5 as well as Fig. 12a actuates a valve in one of the bores 92, as will be pointed out below. The needle valve member 107' fixedly carries a disc-shaped member 173 slidably engaging the inner cylindrical surface of nozzle 102' to center member 107' and having cutouts so that the fluid to be sprayed can flow through member 173. An electrical heating apparatus 174 is provided to heat air under pressure, and a switch 175 is mounted in the path of the flow of the atomizing air so as to be closed by the stream of air. The parts 174 and 175 are located in an additional bore 176 of the housing 73' and a bore 177 is provided to guide the heated air under pressure from the heater 174 to the valve 76'.

Fig. 13 shows part of the structure of Fig. 5 in a transverse sectional view, and as is apparent from Fig. 13, the helical turns 18e of the heat exchanger 4e provide the spiral space 54' in the interior of the housing 73, Fig. 13 also showing the connection 12e for the reservoir which contains the fluid to be sprayed. Also, Fig. 13 illustrates how the heat insulating coating 27' covers housing 73. The conical heating element 83 is also shown in transverse view in Fig. 13 together with the bimetallic temperature regulating device 59'. As is apparent from Fig. 13 several bores 92 are formed in housing 73 to guide gas under pressure or combustible gas to the valve 76 as well as to house a trigger operated valve to control the flow of gas and to house the switch 93 and the switch operating rod 93'. The extension 74 of housing 73 is covered with the handle 96 in the manner shown in Fig. 13 so as to protect the operator against the heat or cold of the apparatus, and Fig. 13 clearly illustrates how the tubes 99 lead to the passages 92, which communicate with the valve 76, for feeding gas to these passages.

Fig. 14 shows a part of the apparatus of Fig. 12a in a transverse sectional view, and, as is apparent from Fig. 14, the housing 73' is provided at its bottom side with its extension 74' covered by the handle 96' in the manner illustrated, and Fig. 14 also illustrates how the pipe 99' guides air or another gaseous medium to one of the passages 92' formed in extension 74', one of these passages 92' housing a switch similar to switch 93 of Fig. 5 and operated in the same way and another of these passages 92' receiving the gas from the conduit 99' as shown in Fig. 14. At the top of Fig. 14 is shown the bore 176 of housing 73' which has the electrical apparatus 174 located therein, and, if desired, instead of providing a bore 176 in an integral part of housing 73', a separate tube may be screwed or otherwise fixed to the housing 73'. An arcuate tube 178 communicates with the interior of the left passage 99' shown in Fig. 14 and with the interior of bore 176 for guiding air to be heated to the heater 174 in bore 176, so that this air may flow along bore 176 to the passage 177 and valve 78" and from the latter out to the passage in ring 159 and from the latter through the nozzle outlets of the spray head 158, as is evident from Fig. 12a. Fig. 14 also illustrates how the inlet 12g of the embodiment of Fig. 12a is connected to a container 91g for the fluid to be distributed so as to admit this fluid to the housing 73'. In Fig. 14 the heat exchanger unit located within the housing 73' is not illustrated.

Fig. 15 shows a variation of the structure of Figs. 12a and 14 according to which the bore 176' for housing the heater 174 is located at one side of the extension 74" of the housing 73". Here also the housing for the air heater may be arranged in any desired manner on the extension 74". The remaining elements shown in Fig. 15 are identical with those of Fig. 14.

The above-described apparatus operates as follows:

When the structure of Figs. 1a, 1b and 1c is used for laboratory purposes, the pressure resistant housing 1 is attached by the extension 2 thereof to a suitable support, the heat exchanger unit 4a, 4b, or 4c is inserted into the housing 1 and is sealed therein in a pressure and fluid tight manner by the nut 3. The following discussion only refers to Fig. 1a, but it is to be understood that the structures of Figs. 1b and 1c operate in the same way. The part 20a of the cap 25a is connected by the line 40' to the end 40 of pipe 36 (Fig. 2) and the line 43' extending from end 43 of line 41 is connected to the part 26a of the cap 25a of Figs. 1a. If a liquid is to be tested with the apparatus through a large range of temperatures, as for example, from minus 50° C. to plus 50° C., then as a heat exchanging fluid medium a substance such as toluol may be used, this substance having a freezing point of minus 95° C. and a boiling point of plus 110° C., and the housing 1 may be made of a material such as transparent Jena glass.

The toluol is filled into the device of Fig. 2 until the suction inlet of pump 32 is submerged and a cooling medium of a desired low temperature is circulated through the coil 46. After adjusting the temperature measuring and regulating device 38 for the lowest test temperature of minus 50° C. the drive through the coupling 33 is set into operation and during the filling of the pipes 36, 41, 40', and 43' as well as the filling of the interior of tube 19 and the helical space 22a, toluol is poured into container portion 29 of Fig. 2 through the inlet 35 so as to maintain the liquid 28 at the desired level where the suction inlet of pump 32 is submerged, and when the level of the liquid remains constant at a desired elevation in gage 30, the filling is stopped. Then the inlet 35 is plugged and the toluol is continuously circulated until the device 38 shows that the temperature of the tuluol remains at a desired constant value. If desired another temperature indicating device may be located at the outlet 26a of cap 25a to indicate the temperature of the liquid returning to the apparatus of Fig. 2.

To the surfaces 6 of the bottom head 5 of housing 1 there may be connected, in free heat-transferring engagement, a shut-off device 7 with a nozzle communicating with one of the bores 8, and a thermometer such as an alcohol thermometer may be inserted into one of the other bores 8 and fastened in this position in a fluid and pressure tight manner through any suitable connecting device in such a way that the fluid to be tested streams past the thermometer. The other openings of the head 5 may be plugged up.

The liquid to be tested is placed into the container 15 and if desired may be placed under pressure by a suitable fluid pressure medium communicating with the interior of container 15 through the inlet 17 thereof so that the liquid to be tested flows through the pipe 14 to the connection 12a at the top of the apparatus and starts to flow down along the top part of the spiral space formed in the interior of housing 1 by the outer surface of the hollow helical guides 18a. In this way the liquid to be tested flows to the bottom of the housing 1. By the time this liquid has reached extension 11a of the heat exchanger unit this liquid has reached the desired temperature as a result of the cooling or heating action of the heat exchanger, and this liquid then flows into the bore 9 of head 5 and after passing the temperature indicating apparatus in one of the bores 8 flows to the discharge control apparatus 7.

Because of the large pitch of the helical heat exchanger coils 18a, the amount of liquid flowing through the interior of these coils is practically equal to the amount of liquid flowing along the exterior of these coils. Since, however, the rate of flow of the heat exchanging medium in the interior hollow space 22a of coils 18a is several times that of the liquid flowing downwardly along the exterior of these coils, and since a very efficient heat transfer is provided by the large surface of contact of the heat exchanger, a very low heat loss of only a few temperature units takes place. The temperature measuring and regulating device 38, which is of a known construction, registers the temperature of the circulating toluol with the thermometer 39, and then automatically regulates either the emperature of the liquid circulating through cooling coil 46 (see Fig. 2) or the amount of liquid circulating therethrough so that the toluol passing through the heat exchanger insert in housing 1 is held as closely as possible to the desired temperature. It is immaterial with the apparatus of the invention whether a row of temperatures are run through in a continuous manner or whether new settings are made for each test temperature, because the apparatus very quickly changes the temperature of the heat exchanging medium to the desired value and because a rapid and efficient heat transfer takes place to set the tested liquid to the desired temperature very quickly.

Through the transparent wall of housing 1 it is possible, during a whole series of tests, to observe various properties of the fluid being tested such as the mixing characteristics of the liquid components, the ability of the test liquid to maintain a desired color, its ability to cling to the surface of the coils of the heat exchanger, the flow characteristics of the liquid, the formation of bubbles, chemical changes, tendencies to gel and the like, and critical points can be easily determined. By changing the amount of fluid flowing through the apparatus, the dependence of the observed characteristics on the load on the heat exchanger surface can be determined and in this way the best operating rate for actual practice can be found out.

If it is desired to examine the behavior of the tested liquid during its heating or cooling from a starting temperature up to a final temperature with respect to additions of further chemical components such as acids, hardeners, and the like, then these latter components may be added to the tested liquid at any desired part of housing 1 through the several inlets 12a in addition to that through which the tested liquid enters the apparatus.

The above description of the operation shows the great flexibility of the heat exchanger apparatus for use in laboratories and the like for exact determination of given chemical or technological characteristics of the tested liquid. The findings may then be transferred without the danger of any changes whatsoever directly into actual practice since the very same heat exchanger used in the laboratory tests is used in commercial apparatus of the most varied types, such as those of Figs. 5 and 12a. In this way the variations between test values obtained in laboratories with particular liquids, such as corrosion resistant coatings, varnishes, lacquers and the like, and values obtained in actual practice are completely eliminated so that both the manufacturer and consumer is assured that indicated behavior values will take place in actual practice. One of the several embodiments of the heat exchangers shown in Figs. 1a, 1b, 1c, 3, 4, 12a or 12b is chosen for a given job in accordance with the load to be applied to the heat exchanger and the characteristics of the heated or cooled fluid to be distributed by the apparatus.

The use of a heat exchanger with a liquid or gas heat exchanging fluid is preferred for lower and medium temperature ranges of about minus 100° C. to plus 200° C. and provides with good efficiency great uniformity of temperature without the danger of heat accumulations at medium heat exchanging outputs, while for a temperature range of from about 20° C. to 500° C. the heat exchanger unit of Fig. 4 provides the best heat exchanging output at the highest efficiency and best temperature uniformity as well as with the simplest construction. Where the apparatus is used to distribute a fluid which is stick or pasty at room temperatures, such as for example, fats, lacquers, and the like, or materials which are solid at room temperature such as bitumen, pitch, metals, in particular lead, tin-zinc alloys, resins, synthetic materials and the like, then these materials are rendered liquid by heating in a known way and are fed to the, in this case, heated container 15 or along heated conduits to the inlet 12a. The desired heating to the required working temperature is then brought about according to the invention by flow of such a preheated liquid along the heat exchanger.

Hardening of such substances by cooling within the apparatus of the invention during interruption in the use of the apparatus makes absolutely no difference with the structure of the invention since such hardened substances, located along the outer helical space defined by the heat exchanger unit and the inner surface of housing 1 and located in the bores 8 and 9 as well as in the discharge control devices 7 and the like, are again heated when the heat exchanger insert is heated when the apparatus is again set into operation, so that such substances are again brought to their liquid state and the test or working process, such as, for example, spraying of a corrosion resistant material in the form of a homogeneous thick film, can continue without any special steps whatsoever since all control devices, nozzles and the like are simultaneously and independently heated by direct transfer of heat from the end 11a of the heat exchanger through the massive head 5 of housing 1 to the several operating devices 7 which contact the head 5, so that all of these parts are independently brought to the working temperature by the apparatus and process of the invention.

The apparatus according to Fig. 2 of the drawings serves to cool or to heat a fluid heat-exchanging medium with fully automatic regulation of the operating temperature and to circulate the heat exchanging fluid to a heat exchanger for laboratory purposes or for actual practice and back to the apparatus of Fig. 2 for renewed temperature control in a continuous circulation.

For the most accurate temperature control of the fluid heating or cooling medium, the coils 45 and 46 are used, which can either be used together for circulating a cooling or heating medium, such as oil, steam and the like, or during tests ranging continuously from extremely low to higher temperatures one coil is used with a cooling medium and the other with a heating medium. For a practical installation together with a working device such as a spray gun and the like it is preferable to use the electrical heating element 44 of Fig. 2. After the apparatus driving the pump 32 through coupling 33 is set into operation, the pump 32 sucks the liquid 28 from container 29 and moves it under pressure along the conduit 36 by the thermometer 39 through the end portion of pipe 36 from where it flows through the hose, pipe, or the like, 40' to the heat exchanger unit where it flows downwardly along the interior of pipe 19a to the opening 23a in this pipe into the hollow space 22a of the coil 18a of the heat exchanger, upwardly along this latter helical space 22a to the collection chamber 24a in cap 25a and through the outlet 26a back along the hose, pipe or the like 43' to the interior of container 27 for renewed heating or cooling. During movement of the fluid heat-exchanging medium through the hollow inner space 22a of coil 18a, the heat of this fluid medium is given up to the coil which transfers heat to the working fluid moving slowly along the outer spiral space of the heat exchanger. In the conduit 36 of the apparatus of Fig. 2 is the switch 37, of a known construction, which at a predetermined lowest temperature closes the electrical circuit through heating element 44 so that heating of the circulating fluid medium begins to produce heating of heat exchanger 4a until the temperature value set into regulator 38 is attained and then the further heating according to the heat transfer from the fluid heat-exchanging medium in the heat exchanger 4a is automatically regulated. Accumulations of heat are effectively avoided.

If the heat exchanging medium in the heat exchanger unit is a superheated steam or other gas, then the embodiment of Fig. 3 is preferred since in this embodiment the pipe coil 51 is embedded in the cast, one-piece body of the heat exchanger unit 4d so that a high safety against great pressures of the inner heating medium is guaranteed. By locating the coil 51 directly in the body of the unit at the base of the helical turns 18d, a good heat flow up to the outer periphery 55 and further to the wall of housing 1 contacting this periphery 55 is assured. If the apparatus of Fig. 3 is used in a device such as that of Figs. 5 or 12a, then the plug 48 is provided with a bore to receive the filter 161 of Fig. 12a and a threaded bore portion to receive the guiding pin 104 of Fig. 5 and 104' of Fig. 12a.

If the heat exchanger unit of Fig. 4 is used in a laboratory device such as that of Fig. 1a or in a working apparatus such as that of Figs. 5 or 12a, then automatic temperature regulation for large heat tolerances or for heat sensitive working mediums such as normal bitumen, tin, lead and the like, is obtained through the adjustable temperature regulating apparatus 59 arranged within the space 60 of body 61 in a heat transferring manner with the latter. In this case, the thickness of tubular body 61 and the contact surface of groove 68 with the coiled heating element 66 of oval cross section is designed in such a way that the temperature at the inner surface of body 61 approaches that which is provided at the outer surface of pipe 69 of the heating element 66. The sensitivity of this temperature control is fully satisfactory for many purposes. Where the heat exchanger unit of Fig. 4 is used with the apparatus of Figs. 5 and 12a to heat a heat sensitive medium such as artificial resins, vulcanizable chemical mixtures, lacquer mixture, and the like, the control of the electrical heating takes place in dependence on the normal heat losses of the entire working apparatus in accordance with the heat requirement provided by the amount of working medium flowing through the apparatus.

Where an electrical heat exchanger unit is used, two heating steps are provided. Step 1 is the heating of the fluid distributing apparatus before a fluid is distributed therethrough and also holds the distributing apparatus during work stoppages at an operating temperature of for example, 90° C. Such heating of the apparatus is adjustable in order to adapt the heat loss to the ambient temperature and working temperature of the apparatus. The corresponding temperature values are obtained by practical tests with filled fluid distributing devices and remains as a continuous partial load on the entire apparatus during use thereof. When the apparatus is plugged in for use, a circuit through heating element 66 of Fig. 4 or 83 of Fig. 5 is immediately completed to bring the apparatus to the operating temperature of step 1.

Actuation of trigger 79 of Fig. 5, which opens nozzle 102 to start the flow of fluid from the apparatus, simultaneously actuates switch 93 in extension 74 of housing 73 to close a second circuit sending more current through the heating element to set into operation the second step of the electrical heat output. This heat output of the second step is also adjustable and is regulated in accordance with the amount of fluid distributed by the apparatus. In this manner, the heat output required for heating the distributing fluid corresponds very closely to the actual heat transmitted to the working fluid. Upon release of trigger 79 and interruption of the flow of the working fluid, heating step 2 is again automatically disconnected and only the partial load of step 1 remains connected to keep the working apparatus hot.

The adjustable temperature regulating apparatus 59 located in the bore 60 of body 61 (Fig. 4) operates in this case to limit the highest temperature at which the apparatus operates when the heat exchanger unit of Fig. 4 is being used, when as a result of operation variations inaccurate adjustments of the values of heating steps 1 and 2 would produce temperatures in excess of a predetermined high temperature. The temperature regulating apparatus 59 interrupts the circuit of both heating steps when a predetermined upper temperature limit is reached. The regulatable adjustment of heating steps 1 and 2 respectively to part-load and full-load can be brought about in a known way by means of electron tubes, adjustable transformers with contact poles or ring cores, or with a continually interrupted full-load with variable impulse durations.

With the embodiment of Fig. 5, the connection 12e has mounted thereon the apparatus for feeding the working fluid into the apparatus. This leading of the working fluid to the apparatus can be brought about with a hose or tube or by applying a pressurized fluid to the interior of a supply container 91. With a working medium which is semi-solid, pasty or completely solid at room temperatures or under unusual atmospheric conditions such as when working in the polar regions of the world, such as for example, fat, thick oil, bitumen, tin, lead and the like, the supply conduits and supply container and the like are constructed in such a way as to be heated so that such working mediums are rendered liquid by any known heating apparatus prior to arriving at the apparatus of the invention.

When the apparatus is connected to a source of current, the above described step 1 is immediately set into operation so that the heat exchanger unit is heated and in this way heats the housings 73 or 73' through heat transferred at the contact between the inner face of these housings with the relatively large outer helical peripheral surface of the coils of the heat exchanger unit. Thus, the head end 78 of the spray gun of Fig. 5 and all of the parts mounted therein and connected thereto are simultaneously heated by heat which freely removes from the end 11e of heat exchanger unit 4e to the head end 78 by direct contact therewith. Heating of the apparatus up to the operating temperature can be accelerated if the pressure for driving the working fluid into the apparatus is cut off and the trigger 79 is actuated so as to close switch 93 and set step 2 into operation. The apparatus will now very quickly heat up to the maximum limiting temperature at which the heat controlling apparatus 59 or 85 shuts off the flow of current. The apparatus is now ready for operation.

Adjustment of the flames 119 takes place after a valve in one of the bores 92 is actuated to allow the combustible gas, acetylene and oxygen, for example, to flow through the apparatus and after opening of valves in conduits leading to the tubes 99 (Figs. 5 and 13). After actuating the trigger 79 so as to fully open the flow control valve apparatus in one of the bores 92, the gas discharging from the apparatus is ignited to provide the flame 119 and valve 76 is actuated to adjust the flame to a desired size and type. Upon release of the trigger 79 the flow control apparatus in bore 92 is set to permit only a small idling flame to burn. If nozzles with fixed bores sizes are used, the form of the thin disc-like, fan-shaped stream is dependent upon the viscosity of the working fluid and the hydraulic pressure thereof.

The regulating valve 76 provides a means for regulating the combustible gas mixture, during operation while the working material is being applied, from a large supply of gas to a medium and small supply of gas and finally to a complete shutting off of the gas supply.

After the working medium is subjected to the desired pressure, the discharge of the working medium from the apparatus may take place. Actuation of trigger 79 causes the control shaft 80 with the toothed sector 81 thereof to be turned in a counterclockwise direction, as viewed in Fig. 5, and the sector 81 cooperates with the rack 109 to move needle valve member 107 to the right, as viewed in Fig. 5, against the action of spring 105, so that the needle valve member 107 slides and is guided along guide pin 104 which extends into the bore 106 of member 107. Thus, valve member 107 moves away from conical part 108 of nozzle 102 and opens bore 125 so that the working medium flows into the pressure chamber 116 and from the latter to the central nozzle 120 and along passages 124' to the lateral nozzles 124. The streams 123 issuing from these lateral nozzles intersect each other and the main stream from nozzle 120 at point 122 on axis 121 along which this main stream moves. The diameters of the lateral and central nozzles are chosen in accordance with the nature of the working medium and combine the streams into a thin disc-like fan which may be applied on a surface to be coated in the form of a homogeneous band of liquid, the lateral fan-shaped flames 119 producing a preheating and drying of the surface to be coated and afterward a uniformity of the applied coating. Instead of flames, superheated gas may be used. Upon release of trigger 79 the latter is automatically returned to its rest position by a spring of the gas flow control apparatus in one of the bores 92 as well as by the spring 105 so that the needle valve member 107 returns to its forward position of rest located against conical end 108 of nozzle 102 whereby the bores 125 are closed. At the same time the flames 119 are reduced to their small idling size and heating step 2 is discontinued.

If a spray head according to that of Figs. 8a and 9a is used, the same operation of the apparatus takes place. However, by means of the equal and opposite turning movements of nozzle members 128, the nozzle bores 129 for the lateral fluid streams can be adjusted to regulate the angle between these lateral streams and the point of intersection thereof with the main central stream, and such adjustment may take place in a continuous manner and with complete uniformity in the simultaneous movements of nozzles 128 so that the shape and size of the fan-shaped film of fluid may be regulated. If the nozzles 128 are adjusted to such an extent that the axes of bores 129 are parallel to axis 121 and are directed forwardly, then the bores 129 become located beyond cutouts 132 and are covered by the front wall of spray head 113a so that the lateral streams of the working medium are cut off to provide only the central stream of fluid. This adjustment is desirable in order to provide a stream capable of reaching into narrow places of difficult accessibility, such as corners and the like, and a high pressure on the fluid capable of producing a stream of a few meters in length is also desirable under such conditions. The adjustment of nozzles 128 is effected by applying a suitable key, wrench or the like, to the non-circular actuating portion 138 of either of these nozzles (Fig. 9a).

If a spray head according to that of Figs. 8b and 9b is used, then the stream of gas or flames issuing from bores 133 of nozzles 134 may be used to convert the central stream of fluid to the shape of a fan or to break up or atomize this central stream of fluid, and these effects may be controlled by adjusting the inclination of nozzles 134 in the manner described above. Also, with extremely high gas pressures the central stream may be atomized to a very great extent. Also, the nozzles 134 may be turned to influence the shape and fineness of the atomized central stream in any desired manner by varying the point at which the lateral combustible gas streams intersect each other and the central stream along axis 121. Of course, instead of a burning gas it is possible to use a superheated noncombustible gas or other heated gas under pressure as the lateral gas streams issuing from bores 133, and these gas streams may be shut off to provide an uninfluenced stream of fluid from the central nozzle, by turning nozzles 134 until bores 133 thereof are covered.

Through the selective use of the most varied types of spray heads on the same working apparatus, a universal flexibility of the apparatus is provided in a manner which has up to the present time not been possible.

With certain types of working mediums it is possible to omit the central nozzle outlets 120 and 120a from the spray heads of Figs. 5 and 8a. In this case a thin disc-like fan-shaped stream is provided only by the lateral intersecting streams issuing from nozzles 124 of Fig. 5 or from the adjustable nozzles 128 of Figs. 8a and 9a.

When the apparatus is to be used with a working medium made up of several components of which one is a base component to be combined with a reaction component, hardener or the like, and where, however, the reaction time is so short that a pre-mixing of the liquids before they are introduced into the apparatus is not possible, the spray head according to Figs. 8b and 9b may be used and instead of directing gases through passages 136 and nozzles 134, one of these two liquid components is directed through these latter passages and nozzles and therefore contacts the other liquid component at the intersecting point of these lateral streams with the main central stream of the other liquid component so that mixing only takes place at this intersection point and thus the several components are mixed together a fraction of a second before they are applied to the surface to be coated. It is also possible to mix three liquids in this way if the apparatus is set up to direct two different liquids respectively through the passages 136 and nozzles 134 communicating therewith while the third liquid passes through the central nozzle.

The spray head according to Figs. 10 and 11 is used only where a hydraulic stream is to be applied without any gases influencing this stream. The head is thus simplified and the trigger 79 of Fig. 5 is directly connected to the main conical valve member 145 for controlling the latter so that upon actuation of trigger 79 the path to the central nozzle 150 and to the lateral nozzle outlets 152 is opened. According to the setting of the inner conical valve member 146 the main valve member 145 acts either as a simple shut-off cock or as a three way valve or as an angle valve for changing the direction of fluid. In its normal working position, valve 146 is set to permit valve 145 to operate as a three way valve so that both the central nozzle 150 and the adjustable lateral nozzle 151 are simultaneously provided with fluid, and this is the position where inner valve 146 is located 180° from the position shown in Fig 10. The operation is basically the same as the spray head of Fig. 8a except that combustible gas streams are omitted. When the inner valve 146 is turned to the illustrated position then only the central nozzle receives the working medium, and in its setting as an angle valve, where valve 146 is located 90° in a counterclockwise direction from the position of Fig. 10, only the lateral nozzles are provided with the working fluid so that the spray head may be adapted for use with the most varied types of working fluids and to produce many different types of streams.

The embodiment of Fig. 12a operates as an atomizing device where air under pressure is heated by the heater 174 and atomizes the central stream in the above-described manner. That is, valve 76' in the head 78", which is heated independently in the same way as was described above in connection with head 78 of valve 76, is regulated to control the flow of the heated air under pressure from tube 176 through passage 177, valve 76' and the annular passage of ring 159 so as to pass into the bores 158 and out through the lateral inclined symmetrically arranged nozzles 158' where these streams of heated air under pressure intersect each other as well as the central stream of liquid issuing from nozzle 102', so as to atomize this stream. The trigger, similar to trigger 79, is actuated to turn the lever 170 so as to move valve member 107' to the rear and the fluid medium passing from the spiral space formed by heat exchanger unit 4g passes through opening 200 and filter 162 to the nozzle. If steam at high pressure is used as the atomizing medium, this steam is superheated in heater 174 so that the danger of moisture deposits on the surface to be coated is reduced to a great extent. Where liquid components are to be mixed immediately before deposition thereof on the surface to be coated, then one of these liquids can be heated by heater 174 and fed through the apparatus of Fig. 12a in the same way as the air or steam under pressure so that the fluid issuing from nozzles 158' mixes with the central stream upon intersecting the same at a point in advance of the spray head of Fig. 12a, and of course in this case no air or steam under pressure is passed through the apparatus. Upon actuation of the trigger of Fig. 12a, the tiltable lever 170 is moved in a clockwise direction so that the bottom end 171 thereof is pressed toward the front of the apparatus. Fig. 12a shows the conventional air chamber and passages about nozzle 102' for shaping the stream of liquid issuing from this nozzle.

Figs. 16–19 of the drawings show embodiments of the invention according to which the heat exchanger unit includes its own outer housing and is located either laterally with respect to the spray gun, as shown in Figs. 16–18, or above the spray gun, as shown in Fig. 19. Referring to Fig. 16 it will be seen that the spray gun body 201 is provided with a handle 202 and a trigger 203 turnable about the pivot pin 203' this spray gun having a hook 201' by which it may be supported on any stationary structure. The body 201 is connected in a pressure and fluid tight manner at its front end to a member 205 which is adapted to receive the material to be sprayed and which is connected to any conventional spray head 204, member 205 being fixed to the body 201 by a screw 206. The member 205 is provided with opposite flat side surfaces 207 (see Fig. 17) which are slightly inclined to the vertical and inclined with respect to each other and which are adapted to act as heat transferring surfaces to transfer heat to member 205 and spray head 204. The member 205 is formed with a transverse threaded bore 208 which has oppositely inclined bore portions extending normal to the surfaces 207, respectively, so that these oppositely inclined bore portions intersect at the central axis of the apparatus, as is evident from Fig. 17. A heat exchanger insert 212 or any of the above described heat exchanger units is located within a separate housing 209 which cooperates with the heat exchanger insert 212 in the same way that any of the above-described housings cooperate with the heat exchanger units described above. At its rear portion the housing 209 is provided with a tubular inlet 215 which is adapted to be connected to a container 210 for the material to be sprayed. The nut 211 holds the insert 212 in the housing 209 in a pressure and fluid tight manner. An inlet 224 extends from the heat exchanger insert 212 and is connected to a conduit 214 which leads a heat exchanger fluid from an apparatus such as that shown in Fig. 2 to the interior of the heat exchanger unit 212. Referring to Fig. 18, it will be seen that an outlet 223 is located beside the inlet 224 for guiding the heat exchanger fluid out of heat exchanger unit 212, and this outlet 223 is connected to a conduit similar to conduit 214 and connected to an apparatus such as that shown in Fig. 2 for guiding the heat exchanger fluid back to the apparatus of Fig. 2. Also, Fig. 18 shows how the front end of housing 209 is formed with a transverse bore through which the bolt 220 extends, this bolt threadedly engaging the interior of threaded bore 208 and being provided with a head 219 which passes, in a pressure and fluid tight manner, against the outer surface of housing 209.

As is most clearly shown in Fig. 17, this front end 221 of housing 209 is provided with a flat surface at its right hand side, as viewed in Fig. 17, pressing against the left surface 207, as viewed in Fig. 17, so that this front end 221 of housing 209 is in heat transferring engagement with part 205 of piston 201. Fig. 17 also shows that this front end 221 of housing 209 is quite massive so that a large amount of heat may be stored in the same. Also, Fig. 17 shows the opposite surface 218 of front end 221 against which the head 219 of bolt 220 bears. As is apparent from Figs. 17 and 18, this bolt is formed with an axial bore 236 extending into the same from the end thereof opposite head 219 and terminating short of bolt head 219.

The heat exchanger unit 212 is provided with helical turns 225 of substantially V-shaped cross section and defining with the inner surface of housing 209 the helical space 227 for the fluid to be distributed. The front end of heat exchanger unit 212 is provided with a cylindrical extension 231 located in sliding engagement with the front end of housing 209 at the cylindrical bore 235 formed therein so that heat is directly transferred, independently of the fluid to be distributed, from the heat exchanger unit to the mass 221 and from the latter to part 205 and the parts of spray pistol 201 connected thereto. The cylindrical extension 231 is formed with an axially extending outer groove 233 communicating at one end with helical space 227 and at an opposite end with the opening 234 formed in bolt 220 so that the fluid to be distributed flows from spiral space 227 through groove 233 and opening 234 into the bore 236 of bolt 220 and from this bore through the spray gun. The inner surface of extension 231 is formed with stepped annular ribs 232 so as to provide a relatively large heat exchanging surface.

An outer tube 229 is located against the inner periphery of helical coil 225 and inner tube 228 is located within tube 229 and is coaxial therewith, these tubes being positioned with respect to each other by the ring 230 fastened to these tubes. A similar ring is provided at the rear end of the heat exchanger unit 212 so that a sealed cylindrical air space is provided between tubes 228 and 229, and the tube 228 terminates short of the inner ribbed surface of extension 231 so that the fluid admitted to the heat exchanger unit through inlet 224 flows around the front end of tube 228 and back through the inner spiral space 226 of the coil 225. The provision of a pair of tubes 228 and 229 greatly cuts down the amount of heat exchanging fluid which must be circulated through the heat exchanger and in this way also greatly reduces the weight of the spraying apparatus. A similar arrangement of inner and outer tubes is shown in Fig. 12b. The outlet 223 communicates with the inner helical space 226 in the manner shown in Fig. 1a, for example.

The end of bore 208 which is not connected to bolt 220 is closed with a suitable plug, and it is apparent that the heat exchanger apparatus may be mounted on either side of the spray gun apparatus. The housing 209 is covered with a heat insulating coating 222. Fig. 17 shows an inlet 216 for receiving a fluid to be distributed from conduit 217, and this arrangement may be provided in lieu of the container 210 and inlet 215 therefor.

According to the embodiment of Fig. 19, the bore 208' extends vertically and spray gun body 201' is provided with a top surface 207' against which the head 221' of the heat exchanger housing 209 is pressed by the bored bolt 220'. Otherwise the construction of Fig. 19 is identical with that of Figs. 16–18. The embodiment of Fig. 19 permits the heat exchanger-unit to be located above the spray pistol apparatus 201' and the heat exchanger unit 209' may be provided with a lateral inlet 237' for the fluid to be distributed.

Handle 2a and trigger 3a may be covered with a heat insulating material to protect the operator when the apparatus is operated at high temperatures, and the embodiments of Figs. 16–19 operate in the same way as the above-described embodiments of the invention. Of course, an electrically heated heat exchanger unit may be inserted in the housing 209 in place of that shown in Fig. 18.

As was mentioned above, the triggers of Figs. 5 and 12a are adapted to automatically operate a valve controlling the flow of gas and located in one of the bores 92. The identical valve and trigger arrangement of Figs. 5 and 12a is shown in Fig. 16 where the trigger 203 engages a rod 230 corresponding to rod 93" of Fig. 5 and extending slidably through a stuffing box 231 and being connected at its right hand end, as viewed in Fig. 16, to a valve member 232 which cooperates with an annular valve seat 233 located in the tubular portion 92" of the apparatus. A spring 234 bears against the inner ends of bore 92" and against the valve member 232 to urge the latter to its closed position so as to thereby urge rod 230 outwardly of bore 92" and against the trigger 203. The grip 202 is formed with a bore portion 235 communicating with a bore portion 236 which in turn communicates with a bore 237 leading to the interior of bore 92" on the right hand side of the valve seat 233. Bores 236 and 237 are plugged with the plugs 238, and a suitable conduit, such as conduit 99 of Fig. 5, for supplying gas to the apparatus is connected to the lower part of bore 235. Therefore, when the trigger 203 is pulled the valve member 232 will move to the right, as viewed in Fig. 16, to uncover the valve seat 233 so as to permit gas to flow through the valve seat to the bore portion 239 leading to the spray head 204 and in the embodiment of Fig. 5 forming part of the bore in which the double-cone valve 76 is located. The upper portion of the trigger 203 shown in Fig. 16 cooperates with a rod 240 for opening the outlet nozzle of the spray apparatus when the trigger 203 is actuated.

It will be understood that each of the elements described above, or two or more together, may also find a useful application in other types of fluid distributing apparatus differing from the types described above.

While the invention has been illustrated and described as embodied in fluid distributing apparatus such as spray guns and the like, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. Fluid distributing apparatus, such as a sprayer or the like, comprising in combination, a housing having an inlet end portion for admitting to the interior of said housing a fluid to be distributed and a heat conductive opposite outlet end portion for discharging the fluid from said housing, said outlet end portion being formed in the interior of said housing with a recess facing said inlet end portion of said housing; and heat transferring means located in said housing for exchanging heat with a fluid as it passes from said inlet to said outlet end portion of said housing, said heat transferring means being removably located in said housing and having an end portion extending into said recess and engaging said housing at said recess thereof so as to exchange heat with said outlet end portion of said housing independently of the fluid itself.

2. Fluid distributing apparatus, such as a sprayer or the like, comprising in combination, a heat conductive housing having an inlet end portion for admitting to the interior of said housing a fluid to be distributed and an opposite heat conductive outlet end portion for discharging the fluid from said housing, said outlet end portion being formed in the interior of said housing with a recess facing said inlet end portion of said housing; and heat transferring means located in said housing for exchanging heat with a fluid as it passes from said inlet to said outlet end portion of said housing, said heat transferring means being removably located in said housing and having an end portion extending into said recess and engaging said housing at said recess thereof to exchange heat with said outlet end portion of said housing independently of the fluid itself, and said heat transferring means having an inner surface portion defining a first space, an outer helical surface portion having a periphery in engagement with the inner surface of said housing, and being formed with a helical second space located about said inner surface portion, extending to a point adjacent from said outlet end portion of said housing toward said inlet end portion thereof, and communicating with the interior of said first space at a point adjacent said end portion of said heat transferring means, said heat transferring means being formed with first and second openings communicating respectively with said first and second spaces so that a fluid heat transferring medium may flow through said first opening into said first space and from the latter along said second space to said second opening in counter-current to a fluid to be distributed flowing along said outer helical surface of said heat transferring means toward said outlet end portion of said housing.

3. Spraying apparatus comprising, in combination, a spray gun having an outlet nozzle at its front end and being formed with a passage leading to said outlet nozzle for guiding a fluid thereto; a tubular extension mounted on said spray gun, communicating with said passage, and having an elongated portion extending outwardly away from said spray gun; a housing mounted on said elongated portion of said tubular extension, communicating at one end with the interior of said tubular extension, and having an inlet located distant from said tubular extension; helical guide means mounted in said housing between said tubular extension and inlet thereof for guiding a fluid admitted to said housing through said inlet thereof along a helical path to said tubular extension so that the fluid flows from the latter to said nozzle, said guide means having an end portion engaging a portion of said housing located adjacent said tubular extension; and heating means operatively connected to said guide means for heating the latter so as to heat the fluid flowing through said housing and tubular extension to said nozzle, the contact between said guide means and housing transferring heat from the former to the latter and from said housing along said tubular extension to said spray gun.

4. Fluid spraying apparatus comprising in combination a housing having a thermally conductive wall and an inlet and an outlet spaced from said inlet, the thermally conductive wall of said housing being between said inlet and outlet, a heat conductive extension of said wall and a nozzle on said heat conductive extension, said outlet being through said heat conductive extension and nozzle, and heat transferring means located in said housing having helical turns contacting the inside surface of said heat conductive housing wall between said inlet and outlet to lend heat by conduction to said wall and thence to said nozzle, said turns affording with said wall surface a helical passage interconnecting said inlet and outlet thus for fluid to be supplied from said inlet to said outlet over said turns and issue heated through said nozzle, and said heat transferring means further having a heat conductive end in said housing and said end itself being in thermally conductive contact with said heat conductive extension to lend heat to said nozzle.

5. Fluid spraying apparatus comprising in combination a housing affording a chamber having opposite ends, a thermally conductive head extension of said housing providing a reduced extension of said chamber outward of one of the ends of said chamber, a nozzle thermally conductively associated with said head extension of the housing and communicating with the chamber through the reduced extension of the chamber, and a heat transfer insert removably accommodated in said chamber by said housing, a thermally conductive reduced end of said insert contacting said thermally conductive head extension of the housing in the reduced extension of the chamber, said insert including helical turns producing a helical passageway with the surface of the housing chamber with said turns, for receiving fluid to be sprayed, said passageway having an inlet and an outlet, the outlet of said passageway communicating with said nozzle through said reduced extension of the chamber, and said insert having heat exchanger means disposed in thermally conductive relation to said helical turns and reduced end for acting on fluid in said passageway and head extension by heat transfer.

6. Fluid spraying apparatus of the character set forth in claim 5 in which said thermally conductive reduced end of the heat transfer insert contacting the head extension of the housing has a groove forming an escape passage with said head extension for the fluid to pass to the nozzle.

7. Fluid spraying apparatus of the character set forth in claim 5 in which the outlet of said helical passageway communicates with said reduced extension of the chamber through space between said housing and heat transfer insert and between the thermally conductive head extension of the housing and said conductive reduced end of the insert, thence with the nozzle.

8. Fluid spraying apparatus of the character set forth in claim 5 in which said thermally conductive reduced end of the heat transfer insert supports a rod and a control valve for said nozzle slidable on the rod.

9. Fluid spraying apparatus comprising in combination a housing affording a chamber having inlet and outlet ends, a thermally conductive head extension of said housing, a nozzle thermally conductively associated with the head extension of the housing, said nozzle having a discharge outlet and a passage communicating with said chamber through the extension of the housing and through an outlet from the outlet end of said chamber, and a heat transfer insert removably accommodated in said chamber by said housing, a thermally conductive end of said heat transfer insert, corresponding to the outlet end of said chamber, contacting the outlet end of said chamber, said insert including helical turns producing a helical passageway with the surface of the housing chamber with said turns, for receiving fluid to be sprayed, said passageway having an inlet and an outlet, the outlet of said passageway communicating with said nozzle through said outlet of the chamber, and said insert having heat exchanger means disposed in thermally conductive relation to said helical turns and thermally conductive end of said heat transfer insert for acting on fluid respectively in said passageway and in said head extension by heat transfer.

10. Fluid spraying apparatus of the character set forth in claim 9 in which said heat exchanger means includes an electrical resistance element having a sheath and the sheath of said element forms said helical turns.

11. Fluid spraying apparatus of the character set forth in claim 9 in which said insert is hollow and contains a sleeve in the hollow space and said heat exchanger means includes an electrical resistance heater supported on said sleeve.

12. Fluid spraying apparatus of the character set forth in claim 9 in which said heat exchanger means includes structure forming a passage for heat exchange fluid to be circulated through said insert, said passage for heat exchange fluid having inlet and outlet openings for the heat exchange fluid to enter and leave the passage for the heat exchange fluid.

13. Fluid spraying apparatus comprising in combination a housing affording a chamber having opposite ends and said housing having an access opening into said chamber at one of the ends of the chamber, a thermally conductive head extension of said housing providing a reduced extension of said chamber outward of the end of said chamber opposite said access opening, a nozzle thermally conductively associated with said head extension of the housing and communicating with said chamber through the reduced extension of said chamber, a heat transfer insert introduced through said access opening and including a thermally conductive reduced end contacting said thermally conductive head extension of the housing in the reduced extension of the chamber and an opposite end in the access opening of said housing, helical turns and producing a helical passageway with the surface of the housing chamber with said turns, for receiving fluid to be sprayed, said helical passageway having inlet and outlet ends, the outlet end of said passageway communicating with said nozzle through the reduced extension of the chamber, and said insert having heat exchanger means disposed in thermally conductive relation to said helical turns and reduced end for acting on fluid in said passageway and head extension by heat transfer, and means at the access opening of said housing for holding said insert sealed in place to said housing, and selectively for releasing said insert for withdrawal lengthwise from said housing.

14. Fluid spraying apparatus of the character set forth in claim 9 in which said nozzle is combined with a spray head for delivering jets of gas outside the nozzle independently of the nozzle output.

15. Fluid spraying apparatus comprising in combination a housing affording a chamber having opposite ends, a thermally conductive head extension of said housing providing a reduced extension of said chamber outward of one of the ends of said chamber, a nozzle thermally conductively associated with said head extension of the housing and communicating with the chamber through said reduced extension of the chamber, and a heat transfer insert removably accommodated in said chamber by said housing, said insert including helical turns producing a helical passageway with the surface of said housing chamber with said turns, for receiving fluid to be sprayed, said passageway having an inlet and an outlet, the outlet of said passageway communicating with said nozzle through said reduced extension of the chamber, a thermally conductive extension of said insert extending into said reduced extension of the chamber and including a control valve component for the nozzle, and said insert having heat exchanger means disposed in thermally conductive relation to said helical turns and thermally conductive extension of said insert, for acting on fluid in said passageway and exchanging heat with said thermally conductive extension of the insert.

References Cited in the file of this patent

UNITED STATES PATENTS

| | | |
|---|---|---|
| 798,300 | Sager | Aug. 29, 1905 |
| 922,333 | Rawson | May 18, 1909 |
| 1,077,697 | Gates | Nov. 4, 1913 |
| 1,369,466 | Piolunek | Feb. 22, 1921 |
| 1,843,842 | Schoop | Feb. 2, 1932 |
| 1,968,992 | Conkling | Aug. 7, 1934 |
| 2,068,205 | Steckel et al. | Jan. 19, 1937 |
| 2,101,922 | Stoesling | Dec. 14, 1937 |
| 2,190,153 | Holmes | Feb. 13, 1940 |
| 2,245,085 | Abbott | June 10, 1941 |
| 2,282,214 | Albertson | May 5, 1942 |
| 2,401,504 | Paasche | June 4, 1946 |
| 2,433,000 | Manning | Dec. 23, 1947 |
| 2,434,911 | Dennyssen | Jan. 27, 1948 |
| 2,521,960 | Arvintz et al. | Sept. 12, 1950 |
| 2,569,251 | Nieburg | Sept. 25, 1951 |
| 2,576,558 | Bede | Nov. 27, 1951 |
| 2,647,800 | Burnam et al. | Aug. 4, 1953 |
| 2,670,238 | Lansing et al. | Feb. 23, 1954 |
| 2,676,843 | Parsons | Apr. 27, 1954 |
| 2,723,880 | Axelson | Nov. 15, 1955 |